United States Patent
Langton et al.

(10) Patent No.: US 9,367,685 B2
(45) Date of Patent: Jun. 14, 2016

(54) DYNAMICALLY OPTIMIZING PERFORMANCE OF A SECURITY APPLIANCE

(71) Applicant: Juniper Networks, Inc., Sunnyvale, CA (US)

(72) Inventors: Jacob Asher Langton, Oakland, CA (US); Daniel J. Quinlan, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 65 days.

(21) Appl. No.: 14/502,661

(22) Filed: Sep. 30, 2014

(65) Prior Publication Data

US 2016/0092684 A1    Mar. 31, 2016

(51) Int. Cl.
G06F 21/56    (2013.01)
G06F 15/18    (2006.01)
G06F 7/02    (2006.01)

(52) U.S. Cl.
CPC .............. *G06F 21/56* (2013.01); *G06F 21/567* (2013.01); *G06F 7/023* (2013.01); *G06F 15/18* (2013.01)

(58) Field of Classification Search
CPC ..... G06F 21/56; G06F 21/562; G06F 21/567; G06F 15/18; G06F 7/023
See application file for complete search history.

(56) References Cited

U.S. PATENT DOCUMENTS

| | | | |
|---|---|---|---|
| 8,495,096 | B1 | 7/2013 | Pereira et al. |
| 2009/0094175 | A1 | 4/2009 | Provos et al. |
| 2011/0047620 | A1 | 2/2011 | Mahaffey et al. |
| 2012/0174227 | A1* | 7/2012 | Mashevsky ........... G06F 21/562 726/24 |
| 2012/0260342 | A1* | 10/2012 | Dube ................... G06F 21/564 726/24 |
| 2014/0130161 | A1* | 5/2014 | Golovanov ........... G06F 21/564 726/23 |

OTHER PUBLICATIONS

IBM, "Method and apparatus for optimally combining different malware detectors", IP.Com No. IPCOM000187486D, Original Publication Date: Sep. 8, 2009.*
Cisco, "Cisco Web Security Appliance", http://www.cisco.com/c/en/us/products/security/web-security-appliance/index.html, Aug. 6, 2014, 3 pages.
Extended European Search Report corresponding to EP Application No. 15 16 0353, mailed Feb. 29, 2016, 7 pages.

* cited by examiner

*Primary Examiner* — Robert Leung
(74) *Attorney, Agent, or Firm* — Harrity & Harrity, LLP

(57) ABSTRACT

A device may identify a set of features associated with the unknown object. The device may determine, based on inputting the set of features into a threat prediction model associated with a set of security functions, a set of predicted threat scores. The device may determine, based on the set of predicted threat scores, a set of predicted utility values. The device may determine a set of costs corresponding to the set of security functions. The device may determine a set of predicted efficiencies, associated with the set of security functions, based on the set of predicted utility values and the set of costs. The device may identify, based on the set of predicted efficiencies, a particular security function, and may cause the particular security function to be executed on the unknown object. The device may determine whether another security function is to be executed on the unknown object.

20 Claims, 14 Drawing Sheets

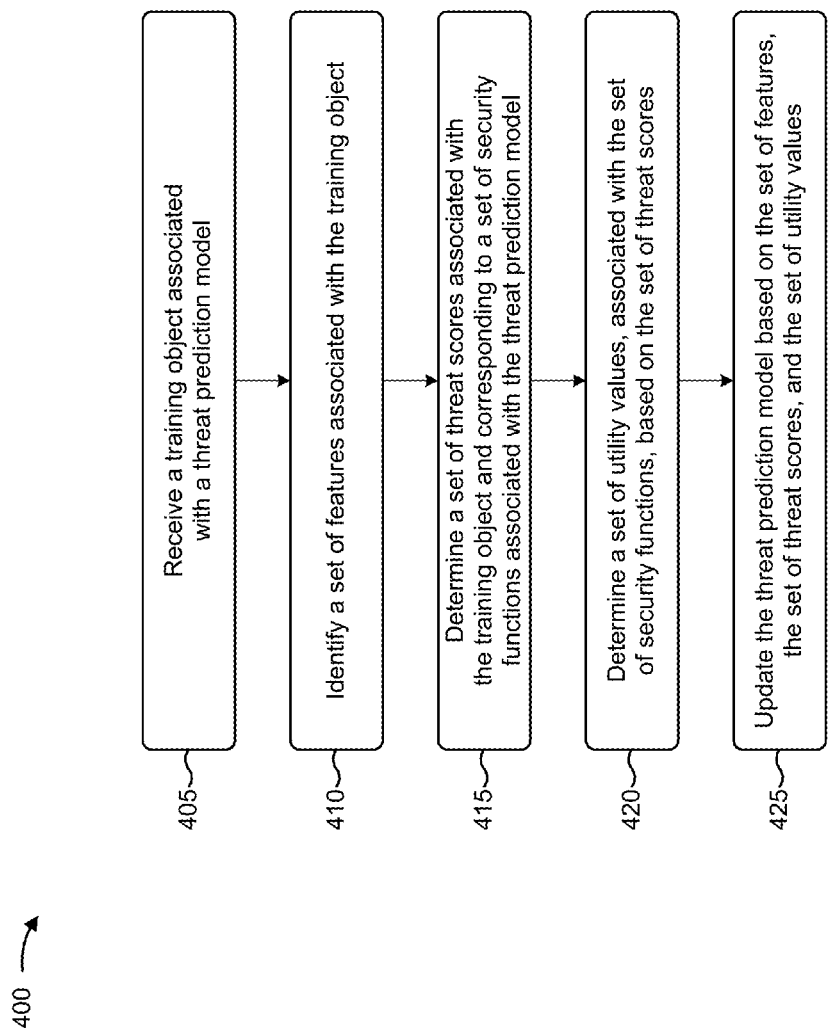

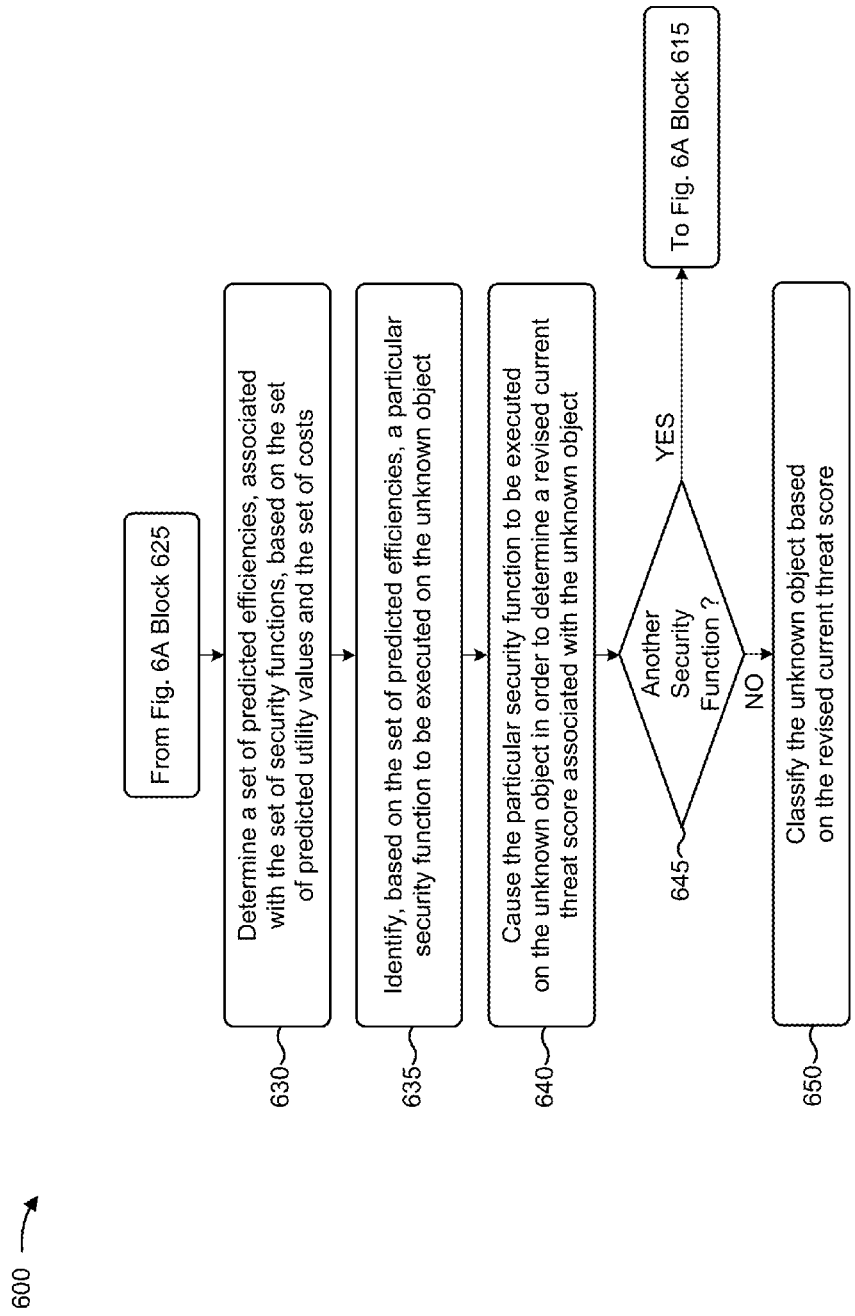

DYNAMICALLY OPTIMIZING PERFORMANCE OF A SECURITY APPLIANCE

BACKGROUND

A security device may be positioned between a user device and a server device (e.g., a server device associated with a web site). The security device may be configured to detect (e.g., using uniform resource locator (URL) reputations, blacklists, anti-virus scanning, anti-malware techniques, etc.) malicious objects (e.g., a Trojan, a worm, a spyware program, etc.), provided by the server device, and/or may be configured to prevent the malicious objects from being received by the user device.

SUMMARY

According some possible implementations, a security device may comprise one or more processors to: receive an unknown object; identify a set of features associated with the unknown object; determine, based on inputting the set of features into a threat prediction model, a set of predicted threat scores, where the threat prediction model may be associated with a set of security functions, and where a predicted threat score, of the set of predicted threat scores, may correspond to a security function of the set of security functions; determine, based on the set of predicted threat scores, a set of predicted utility values, where a predicted utility value, of the set of predicted utility values, may correspond to a security function of the set of security functions; determine a set of costs corresponding to the set of security functions; determine a set of predicted efficiencies, associated with the set of security functions, based on the set of predicted utility values and the set of costs; identify, based on the set of predicted efficiencies, a particular security function, of the set of security functions, that is to be executed on the unknown object; cause the particular security function to be executed on the unknown object in order to determine a current threat score associated with the unknown object; and determine, based on the current threat score, whether another security function, of the set of security functions, is to be executed on the unknown object.

According to some possible implementations, a computer-readable medium may store one or more instructions that, when executed by one or more processors, cause the one or more processors to: obtain an unknown object; identify a set of features associated with the unknown object; determine, based on providing the set of features as an input to a threat prediction model, a set of predicted threat scores and a set of predicted utility values, where the threat prediction model may be associated with a set of security functions, and where a predicted threat score, of the set of predicted threat scores, may correspond to a security function of the set of security functions; identify, based on the set of predicted threat scores, a set of predicted utility values, where a predicted utility value, of the set of predicted utility values, may correspond to a security function of the set of security functions; determine a set of costs corresponding to the set of security functions; determine a set of predicted efficiencies based on the set of predicted utility values and the set of costs, where a predicted efficiency, of the set of predicted efficiencies, may correspond to a security function of the set of security functions; identify, based on the set of predicted efficiencies, a particular security function, of the set of security functions, that is to be executed on the unknown object; cause the particular security function to be executed on the unknown object; determine a current threat score, associated with the unknown object, based on causing the particular security function to be executed on the unknown object; and determine, based on the current threat score, whether the unknown object is a malicious object.

According to some possible implementations, a method may include: receiving, by a device, an unknown object; identifying, by the device, features associated with the unknown object; providing, by the device, information associated with the features as input to a model associated with a set of security functions; receiving, by the device and as an output of the model, a set of predicted utility values, where a predicted utility value, of the set of predicted utility values, may correspond to a security function of the set of security functions; determining, by the device, a set of costs corresponding to the set of security functions; determining, by the device and based on the set of predicted utility values and the set of costs, a set of predicted efficiencies associated with the set of security functions; identifying, by the device and based on the set of predicted efficiencies, a particular security function, of the set of security functions, that is to be executed on the unknown object; executing, by the device, the particular security function on the unknown object in order to determine a revised threat score associated with the object; and determining, by the device and based on the revised threat score, whether another security function, of the set of security functions, is to be executed on the unknown object.

BRIEF DESCRIPTION OF THE DRAWINGS

FIG. 4 is a flow chart of an example process for updating a threat prediction model based on a set of features, a set of threat scores, and a set of utility values associated with a training object;

FIGS. 6A and 6B are a flow chart of an example process for identifying, based a set of predicted efficiencies associated with a set of security functions included in a threat prediction model, a particular security function that is to be executed on an unknown object, and causing the particular security function to be executed on the unknown object to determine a threat score associated with the unknown object.

DETAILED DESCRIPTION

The following detailed description of example implementations refers to the accompanying drawings. The same reference numbers in different drawings may identify the same or similar elements.

A security device may host or access a set of security functions associated with determining whether an object (e.g., an executable object, a web page object, a text object, an image object, a page layout object, a compressed object, etc.) is a malicious object. For example, the security device may host or access an antivirus scanning function, a static analysis function, a code emulator function, a virtual sandbox function, and/or another type of security function. In some implementations, the security device may receive an object, and may execute one or more of the security functions on the object in order to determine whether the object is a malicious object. However, executing numerous and/or all available security functions on the object may result in wasted computing resources (e.g., central processor unit (CPU) time, memory, etc.) when executing a particular security function and/or a relatively small number of security functions on the object may be sufficient to determine whether the object is a malicious object.

Implementations described herein may provide a security device with a threat prediction model that may be used to identify a subset of security functions, of a set of security functions, that, when executed on an unknown object, may provide a determination of whether the unknown object is a malicious object while efficiently using computing resources.

FIGS. 1A-1D are diagrams of an overview of an example implementation 100 described herein. For the purposes of example implementation 100, assume that a security device hosts a set of security functions (e.g., security function 1 (SF1) through security function X (SFX)) associated with determining whether an unknown object (e.g., to be provided to a client device, received by a client device, stored on a client device, to be provided to a server device, received by a server device, stored on a server device, etc.) is a malicious object. Further, assume that the security device manages a threat prediction model associated with predicting a result of executing a security function (e.g., SF1 through SFX) on the unknown object (without executing SF1 through SFX on the unknown object).

Figure 1A:
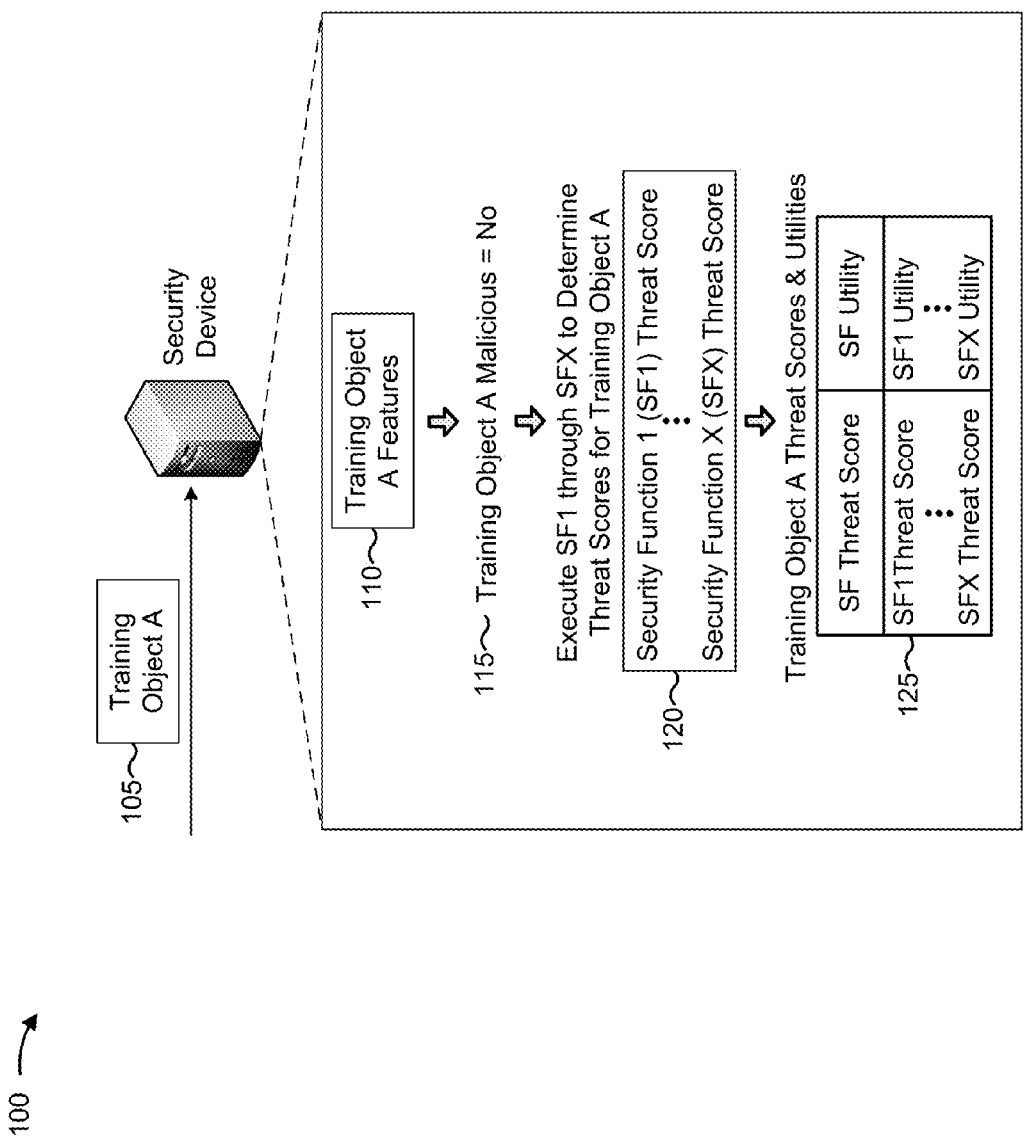
FIGS. 1A-1D are diagrams of an overview of an example implementation described herein.

As shown in FIG. 1A, and by reference number 105, the security device may receive a first training object (e.g., training object A) associated with updating the threat prediction model. As shown by reference number 110, the security device may determine (e.g., based on inspecting training object A, analyzing training object A, etc.) a set of features associated with training object A. As shown by reference number 115, the security device may determine (e.g., based on information included in training object A) that training object A is not a malicious object. As shown by reference number 120, the security device may execute each security function (e.g., SF1 through SFX) on the training object, in order to determine a set of threat scores associated with SF1 through SFX (e.g., SF1 threat score through SFX threat score).

As shown by reference number 125, the security device may then determine, based on the set of threat scores and the information indicating that training object A is not a malicious object, a set of utility values associated with SF1 through SFX (e.g., SF1 utility through SFX utility). In some implementations, a utility value, corresponding to a security function, may include information indicating how useful the security function is in determining whether an object (e.g., with a particular set of features) is malicious.

Figure 1B:
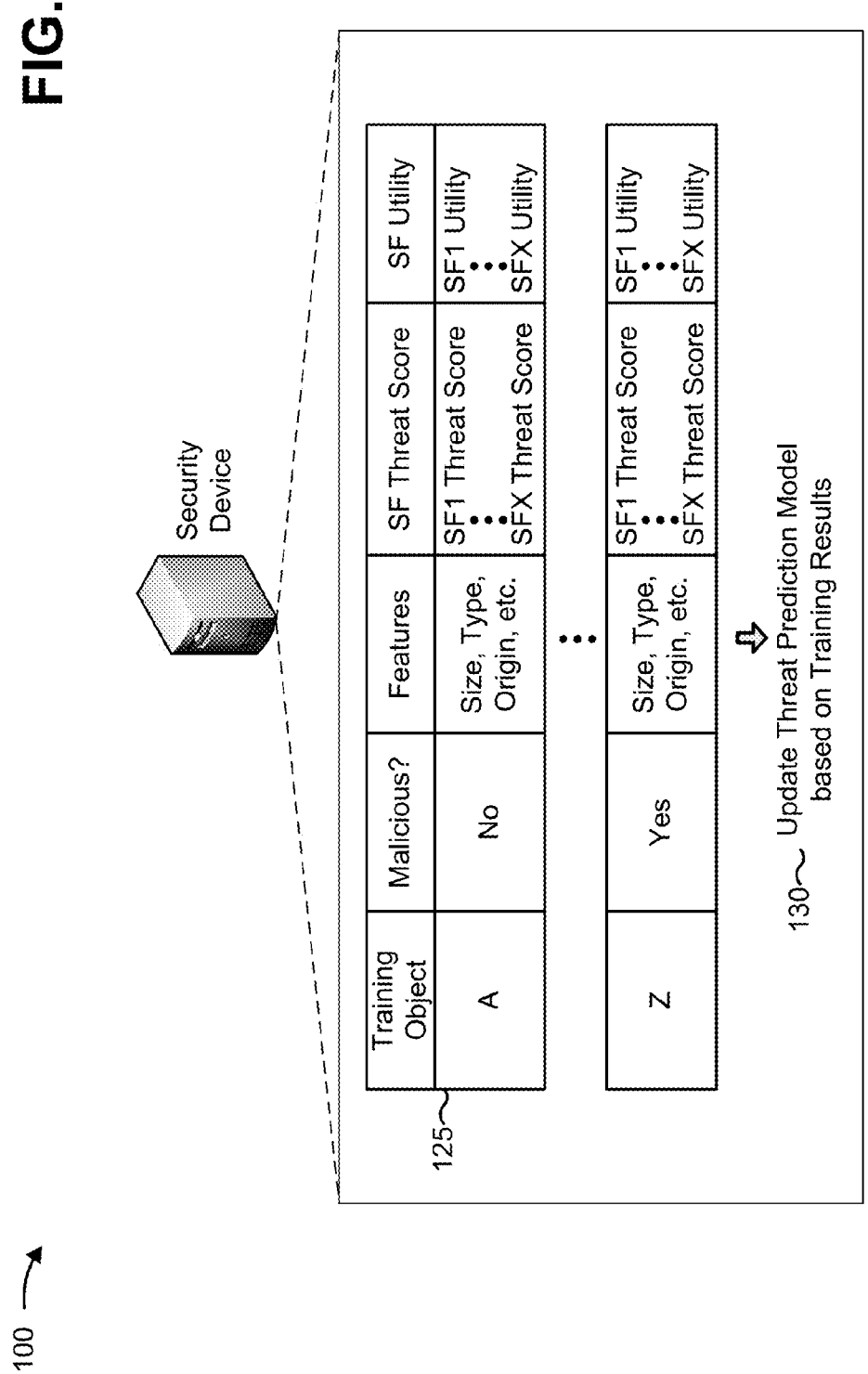

As shown in FIG. 1B, and by reference number 130, the security device may repeat this process for additional training objects (e.g., training object B through training object Z). In this way, the security device may determine utility values associated with SF1 through SFX based on multiple training objects with a variety of set of features. As shown by reference number 130, the security device may update the threat prediction model based on the sets of features, the sets of threat scores, and the sets of utility values associated with each training object. In this manner, the security device may train the threat prediction model for use in determining whether unknown objects are malicious objects (e.g., based on a set of features associated with the unknown object).

Figure 1C:
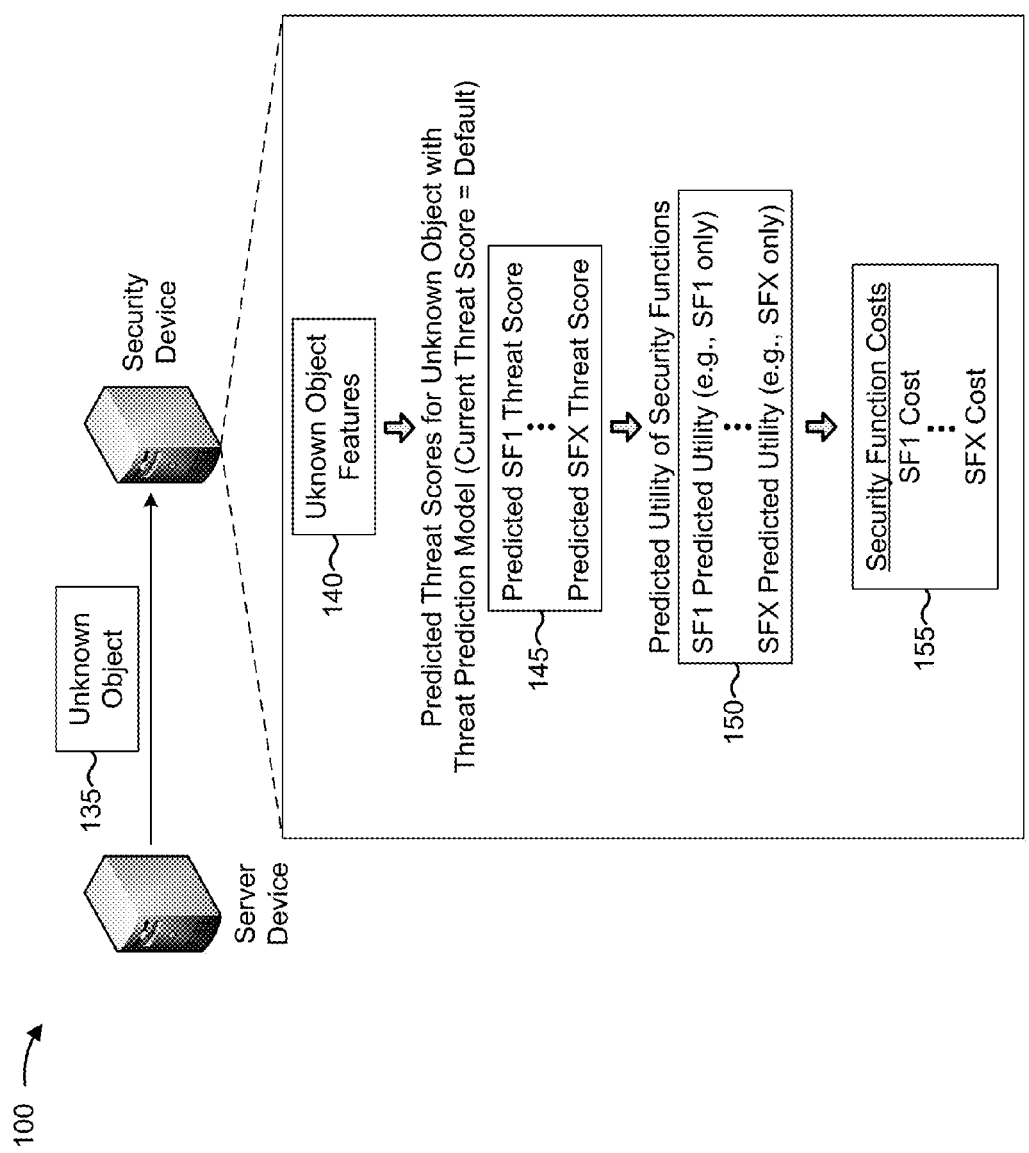

As shown in FIG. 1C, and by reference number 135, a server device may provide (e.g., based on a request from a client device protected by the security device) an unknown object to the security device. As shown by reference number 140, the security device may determine a set of features associated with the unknown object. As shown by reference number 145, the security device may determine, based providing information associated with the set of features as inputs to the threat prediction model, a set of predicted threat scores for SF1 through SFX. As shown by reference number 150, based on the set of predicted threat scores and a current threat score (e.g., a default threat score since no security function has been executed on the unknown object), the security device may determine a set of predicted utility values corresponding to SF1 through SFX. As shown by reference number 155, the security device may also determine a set of function costs corresponding to SF1 through SFX (e.g., a length of time needed to execute each security function, a quantity of computing resources need to execute each security function, etc.).

Figure 1D:
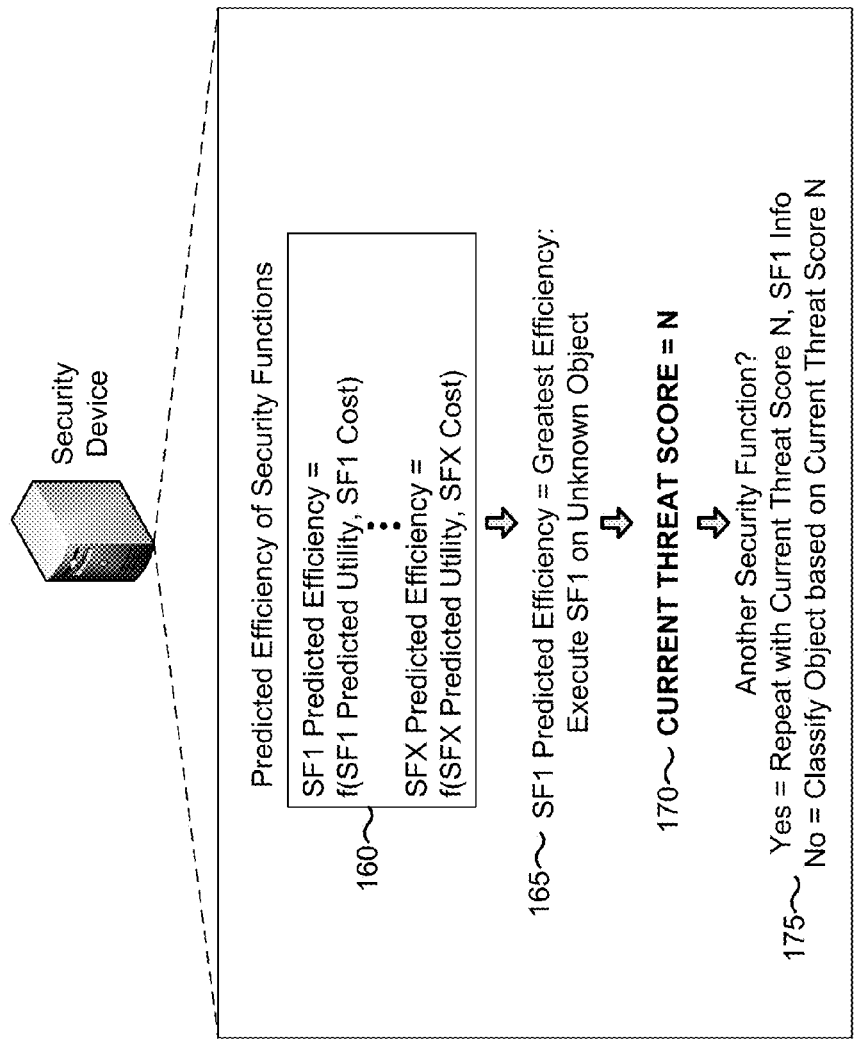

As shown in FIG. 1D, as shown by reference number 160 and based on the set of utility values and the set of function costs, the security device may determine a set of predicted efficiencies corresponding to SF1 through SFX. In this way, a cost may be taken into consideration when identifying a particular security function to be executed on the unknown object. As shown by reference number 165, the security device may identify SF1 as the security function with the greatest predicted efficiency, and may execute SF1 on the unknown object. As shown by reference number 170, the security device may execute SF1 on the unknown object and determine a revised current threat score (e.g., M, a result of executing SF1 on the unknown object). As shown by reference number 175, the security device may determine (e.g., based on the revised current threat score) whether another security function is to be executed on the unknown object. As shown, if the security device determines that another security function is to be executed on the unknown object, then the security device may repeat the above process based on the revised current threat score (e.g., and other information associated with executing SF1 on the unknown object). However, if the security device determines that another security function is not to be executed on the unknown object, then the security device may classify the unknown object based on the revised current threat score and/or may take another type of action (e.g., provide the revised current threat score, store the revised current threat score, etc.). Additionally, the security device may further update the threat prediction model based on the set of features, the revised current threat score, and/or other information determined by the security device as described above. In this manner, the security device may dynamically update the threat prediction model.

In this way, a security device may manage and/or use a threat prediction model to identify a subset of security functions, of a set of security functions, that, when executed on an unknown object, may provide a determination of whether the unknown object is a malicious object while efficiently using computing resources.

Figure 2:
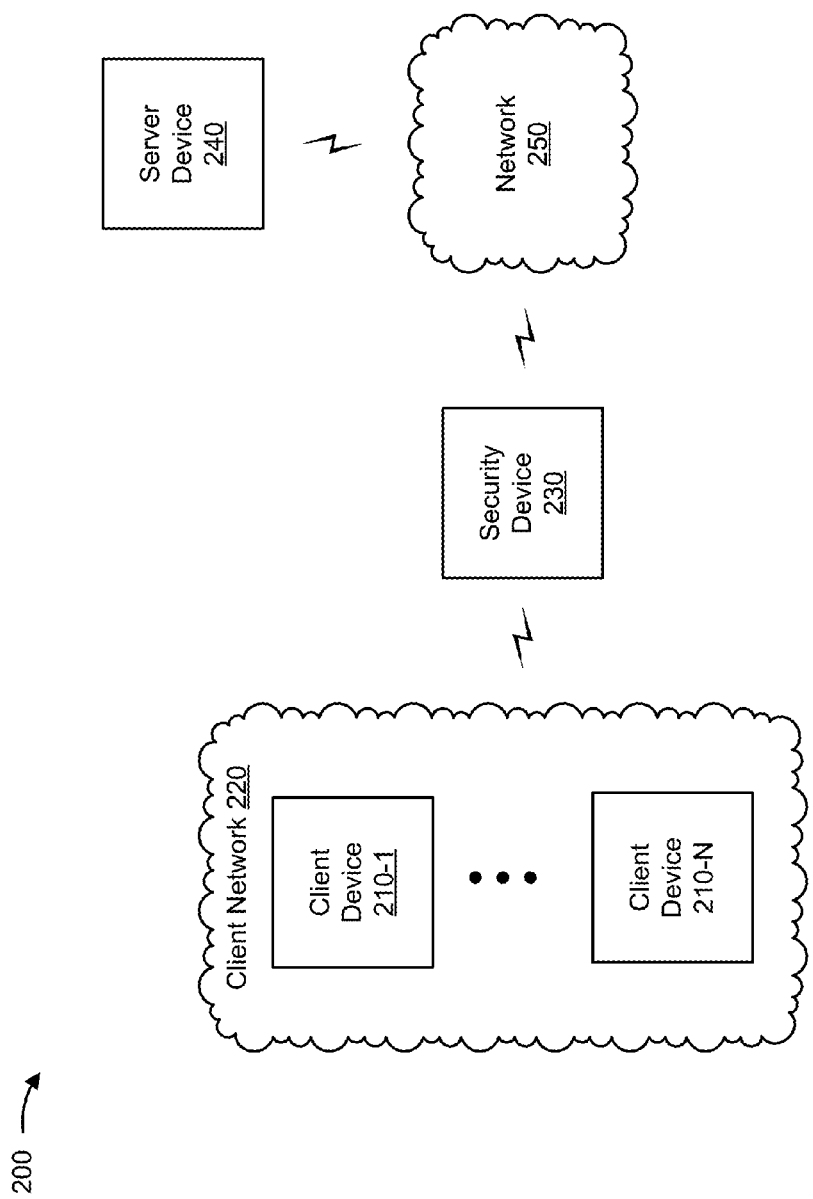
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as client devices 210, and individually as client device 210), a client network 220, a security device 230, a server device 240, and a network 250. Devices of environment 200 may interconnect via wired connections, wireless connections, or a combination of wired and wireless connections.

Client device 210 may include one or more devices capable of communicating with other devices (e.g., other client devices 210, security device 230, server device 240, etc.) via a network (e.g., client network 220, network 250, etc.). For example, client device 210 may include a computing device, such as a laptop computer, a tablet computer, a handheld computer, a desktop computer, a mobile phone (e.g., a smart phone, a radiotelephone, etc.), a personal digital assistant, or a similar device. In some implementations, client device 210 may be included in client network 220.

Client network 220 may include one or more wired and/or wireless networks associated with a group of client devices 210. For example, client network 220 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, a cloud computing network, and/or a combination of these or other types of networks. In some implementations, client network 220 may include one or more client devices 210 and/or one or more security devices 230. In some implementations, client network 210 may be a private network associated with a business, a company, a customer of a service provider, or the like.

Security device 230 may include one or more devices capable of receiving, generating, determining, providing, and/or storing information associated with a threat prediction model, such as a predicted threat score associated with an unknown object. For example, security device 230 may include a computing device, such as a server device, or a group of server devices. Additionally, or alternatively, security device 230 may be implemented within a cloud computing network using one or more virtual machines. In some implementations, security device 230 may host a set of security functions associated with determining a threat score for an unknown object. In some implementations, one or more security functions hosted by security device 230 may involve a cloud service (e.g., a hash lookup service, a cloud scanning service, etc.) and/or a service provided by another device (e.g., an additional on-site device).

In some implementations, security device 230 may include one or more devices capable of processing and/or transferring traffic associated with client devices 210 included in client network 220. For example, security device 230 may include a network device, such as a reverse proxy, a server (e.g., a proxy server), a traffic transfer device, a firewall, a router, a load balancer, or the like.

In some implementations, security device 230 may be capable of managing, updating, storing and/or providing information associated with the threat prediction model. Additionally, or alternatively, security device 230 may be capable of training the threat prediction model based on a training object associated with the threat prediction model. Additionally, or alternatively, security device 230 may be capable of determining a predicted threat score, associated with an unknown object, based on the threat prediction model. Additionally, or alternatively, security device 230 may be capable of applying machine learning techniques to the threat prediction model (e.g., based on a predicted threat score associated with the unknown object, based on a threat score associated with a training object, etc.) in order to dynamically update the threat prediction model, manage the threat prediction model, or the like.

Security device 230 may be used in connection with a single client network 220 or a group of client networks 220. Communications may be routed through security device 230 to reach the one or more client devices 210. For example, security device 230 may be positioned within a network as a gateway to client network 220 that includes one or more client devices 210. Additionally, or alternatively, security device 230 may be used in connection with a single server device 240 or a group of server devices 240 (e.g., a data center). Communications may be routed through security device 230 to reach the one or more server devices 240. For example, security device 230 may be positioned within a network as a gateway to a private network that includes one or more server devices 240.

Server device 240 may include one or more devices capable of receiving, generating, storing, and/or providing an unknown object to security device 230 and/or client device 210. For example, server device 240 may include a computing device, such as a server (e.g., an application server, a content server, a host server, a web server, etc.) or a collection of servers.

Network 250 may include one or more wired and/or wireless networks. For example, network 250 may include a WLAN, a LAN, a WAN, a MAN, a telephone network, a cellular network, a PLMN, an ad hoc network, an intranet, the Internet, a fiber optic-based network, a cloud computing network, and/or a combination of these or other types of networks. In some implementations, network 250 may allow communication between devices, such as client device 210, security device 230, and/or a server device 240.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
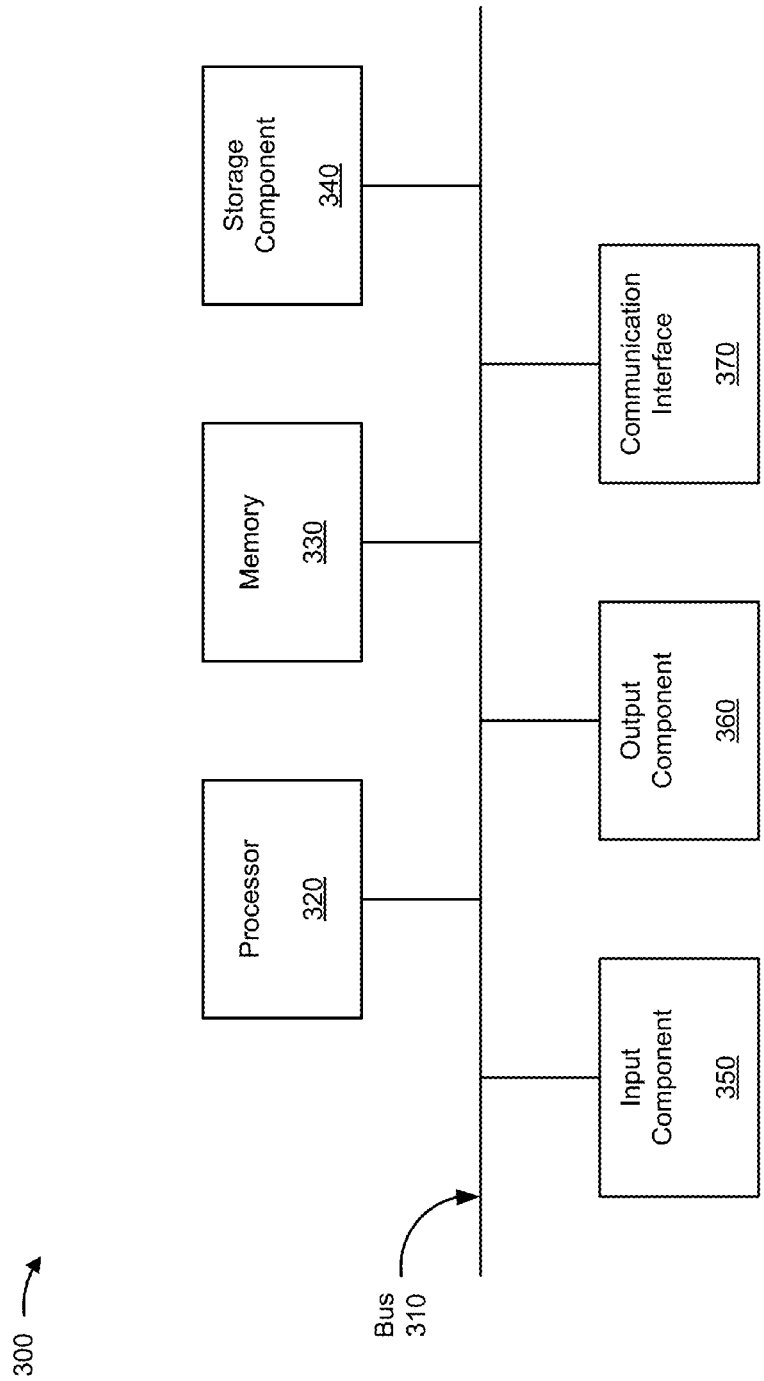
FIG. 3 is a diagram of example components of one or more devices of FIG. 2.

FIG. 3 is a diagram of example components of a device 300. Device 300 may correspond to client device 210, security device 230, and/or server device 240. In some implementations, client device 210, security device 230, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for updating a threat prediction model based on a set of features, a set of threat scores, and a set of utility values associated with a training object. In some implementations, one or more process blocks of FIG. 4 may be performed by security device 230. In some implementations, one or more process blocks of FIG. 4 may be performed by another device or a group of devices separate from or including security device 230, such as client device 210 or another device operating to train the threat prediction model for use by security device 230.

As shown in FIG. 4, process 400 may include receiving a training object associated with a threat prediction model (block 405). For example, security device 230 may receive a training object associated with a threat prediction model. In some implementations, security device 230 may receive the training object from another device (e.g., a device associated with generating the training object). In some implementations, security device 230 may receive the training object based on user input (e.g., when a user of security device 230 creates the training object).

A training object may include an object associated with training a threat prediction model. For example, the training object may include an executable object (e.g., a Windows executable file (EXE), a Windows script file (WSF), etc.), a web page object (e.g., a hypertext markup language (HTML) document, etc.), a text object (e.g., a Microsoft Word document (DOC), a plain text file (TXT)), a page layout object (e.g., a portable document format file (PDF), a picture file (PCT)), an image object (e.g., a joint photographic experts group (JPEG) file, a tagged image file format (TIFF) file, etc.), a compressed object (e.g., a zipped file (ZIP), a WinRAR compressed archive (RAR), etc.), or another type of object. In some implementations, the training object may be described by a set of features (e.g., a size, a signature, a type, a source, a platform, etc.). In some implementations, the training object may be a malicious object of a known malicious object type (e.g., a Trojan, a worm, spyware, malware, ransomware, etc.). Additionally, or alternatively, the training object may be a non-malicious malicious object. In some implementations, the training object may include information indicating whether the training object is a malicious object or a non-malicious object (e.g., a benign object). In some implementations, security device 230 may use the training object to train (e.g., update, manage, adjust, etc.) a threat prediction model stored or accessible by security device 230. In some implementations, security device 230 may receive multiple training objects in order to train the threat prediction model.

A threat prediction model may include a model designed to predict a threat score (e.g., a probability of maliciousness, a likelihood of maliciousness, etc.) associated with executing one or more security functions, of a set of security functions, on an unknown object. For example, in some implementations, the threat prediction model may include a machine-learning model, such as a support vector machine. Additionally, or alternatively, the threat prediction model may include another type of model. In some implementations, security device 230 may store information associated with the threat prediction model. Additionally, or alternatively, security device 230 may provide information associated with the threat prediction model to another device (e.g., client device 210) such that the threat prediction model may be used to predict a threat score associated with executing a security function on an unknown object received by client device 210.

In some implementations, the threat prediction model may use, as an input, information associated with a set of features that describe an unknown object, and may provide, as an output, a predicted threat score associated with executing one or more security functions on the unknown object (e.g., without actually executing the one or more security functions on the unknown object). Additionally, or alternatively, the threat prediction model may use a first threat score, associated with executing a first security function on the object, as an input, and may provide, as an output, a predicted threat score associated with executing a second security function on the object (e.g., without executing the second security function on the unknown object). Additionally, or alternatively, the threat prediction model provide, as an output, a predicted utility value associated with executing a security function on the unknown object. Additional details associated with the threat prediction model, such as training the threat prediction model, managing the threat prediction model, using the threat prediction model, or the like, are described below.

As further shown in FIG. 4, process 400 may include identifying a set of features associated with the training object (block 410). For example, security device 230 may identify a set of features associated with the training object. In some implementations, security device 230 may identify the set of features associated with the training object after security device 230 receives the training object. Additionally, or alternatively, security device 230 may identify the set of features associated with the training object when security device 230 receives information indicating that security device 230 is to identify the set of features associated with the training object.

As described above, the set of features may include information associated with a size of the training object (e.g., an overall size of the training object, a size of a section of the training object, etc.), a signature associated with the training object (e.g., information associated with authenticating the training object), a type of the training object (e.g., EXE, TIFF, PDF, etc.), a source of the training object (e.g., a geographic location, an internet protocol (IP) address, information identifying a source network, etc.), a platform associated with the training object (e.g., information identifying an operating system, information identifying a version of the operating system, etc.), maliciousness information associated with the training object (e.g., whether the object includes malware, a type of malware included in the object, etc.), metadata information associated with the training object, and/or another type of information.

In some implementations, security device 230 may identify the set of features based on analyzing the training object, inspecting the training object, examining the training object, or the like. Additionally, or alternatively, security device 230 may identify the set of features based on receiving information that identifies the set of features (e.g., when security device 230 receives the information that identifies the set of features along with the training object).

As further shown in FIG. 4, process 400 may include determining a set of threat scores associated with the training object and corresponding to a set of security functions associated with the threat prediction model (block 415). For example, security device 230 may determine a set of threat scores associated with the training object and corresponding to the set of security functions associated with the threat prediction model. In some implementations, security device 230 may determine the set of threat scores after security device 230 receives the training object. Additionally, or alternatively, security device 230 may determine the set of threat scores when security device 230 identifies the set of features associated with the training object (e.g., before security device 230 identifies the set of features associated with the training object, after security device 230 identifies the set of features associated with the training object, concurrently with security device 230 identifying the set of features associated with the training object). Additionally, or alternatively, security device 230 may determine the set of threat scores when security device 230 receives information indicating that security device 230 is to determine the set of threat scores.

A threat score may include a result associated with executing a security function on an object (e.g., a training object or a unknown object). For example, the threat score may include information indicating whether the security function identified the object as a malicious object or a benign object. As another example, the threat score may include a value (e.g., from zero to one, from zero to 100, etc.), determined by the security function, identifying a probability that the object is a malicious object. As yet another example, the threat score may include a level of maliciousness determined by the security function (e.g., where a threat score of zero may indicate that the object is not malicious, a threat score of 1 may indicate that the object is malicious). Additionally, or alternatively, the threat score may include other information determined by the security function, such as a type of maliciousness associated with the object (e.g., whether the object includes malware, a virus, a Trojan, spyware, ransomware, etc.). In some implementations, the threat score may be used to classify an object as malware, as described in further detail below.

In some implementations, security device 230 may determine the set of threat scores by causing the set of security functions to be executed on the training object. For example, security device 230 may host or have access to an antivirus scanning function, a static analysis function, a code emulator function, a virtual sandbox function, a malware detection function, a spyware detection function, ransomware detection function, and/or another type of security function. In this example, security device 230 may cause each security function, of the set of security functions, to be executed on the training object, and may determine a threat score associated with a respective security function of the set of security functions. In some implementations, security device 230 may execute one or more of the set of security functions on the training object (e.g., when security device 230 hosts the security functions. Additionally, or alternatively, security device 230 may cause one or more of the set of security functions to be executed on the object by another device or set of devices, and may determine the threat score based on information received from the other device(s). In some implementations, security device 230 may determine a cost associated with a security function (e.g., a length of time needed to execute the security function on the training object, a quantity of CPU time needed to execute the security function on the training object, a quantity of memory needed to execute the security function on the training object, etc.). In some implementations, security device 230 may also determine an accuracy associated with the set of threat scores for each security function (e.g., whether, based on the set of threat scores, each security function correctly identified the training object as a malicious object).

As further shown in FIG. 4, process 400 may include determining a set of utility values, associated with the set of security functions, based on the set of threat scores (block 420). For example, security device 230 may determine a set of utility values, associated with the set of security functions, based on the set of threat scores. In some implementations, security device 230 may determine the set of utility values after security device 230 determines the set of threat scores. Additionally, or alternatively, security device 230 may determine the set of utility values when security device 230 receives information indicating that security device 230 is to determine the set of utility values.

A utility value may include information that identifies a degree of usefulness for a threat score associated with an object and determined by a security function. For example, the utility value may include information (e.g., a numerical value between zero and one, a numerical value between 0 and 100, etc.) indicating whether the security function, when executed on the object, correctly and/or accurately determines a threat score indicating that a malicious object is a malicious object, incorrectly and/or inaccurately determines a threat score indicating that a malicious object is a benign object, correctly and/or accurately determines a threat score indicating that a benign object is a benign object, incorrectly and/or inaccurately determines a threat score indicating that a benign object is a malicious object, or the like.

In some implementations, the utility value may be based on whether the security function determines a threat score indicating that a malicious object is a malicious object. For example, the utility value may be higher for a first threat score, determined by a first security function, indicating that a malicious object is a malicious object, than a second threat score, determined by a second security function, indicating that the malicious object is a benign object. In some implementations, the utility value may be based on whether the security function determines a threat score indicating that a benign object is a benign object. For example, the utility value may be higher for a first threat score, determined by a first security function, indicating that a benign object is a benign object, than a second threat score, determined by a second security function, indicating that the benign object is a malicious object.

In some implementations, security device 230 may determine the utility value based on the set of threat scores and the information indicating whether the training object is a malicious object. For example, security device 230 may determine a high utility value (e.g., 1.0, 100, etc.) for a security function that determines a threat score that correctly identifies a malicious object as a malicious object. As another example, security device 230 may determine a low utility value (e.g., zero) for a security function that determines a threat score that incorrectly identifies the malicious object as a benign object. As yet another example, security device 230 may determine a moderate utility value (e.g., 0.1, 0.5, etc.) for a security function that correctly identifies a benign object as a benign object. In some implementations, security device 230 may determine that utility value based on information stored by security device 230 (e.g., a set of static utility values, a utility value function, etc.).

As further shown in FIG. 4, process 400 may include updating the threat prediction model based on the set of features, the set of threat scores, and the set of utility values (block 425). For example, security device 230 may update the threat prediction model based on the set of features, the set of threat scores, and the set of utility values. In some implementations, security device 230 may update the threat prediction model after security device 230 computes the set of utility values. Additionally, or alternatively, security device 230 may update the threat prediction model when security device 230 receives information indicating that security device 230 is to update the threat prediction model.

In some implementations, security device 230 may update the threat prediction model based on the set of features, the set of threat scores, and/or the set of security functions. For example, security device 230 may identify a set of features associated with the training object, determine a set of threat scores associated with the training object, and determine a set of utility values associated with the training object, and may update the threat prediction model based on the set of features (e.g., such that the threat prediction model is more likely to determine a set of predicted threat scores approximately equal to the set of threat scores, and a set of predicted utility values approximately equal to the set of utility values when an unknown object includes features similar to the set of features associated with the training object).

In some implementations, security device 230 may also update the threat prediction model based on information associated with an unknown object. For example, as described below, security device 230 may determine (e.g., based on providing information associated with a set of features as an input to the threat prediction model) a set of predicted threat scores and/or a set of predicted utility values, may identify one or more security functions to be executed on the unknown object, and may determine (e.g., based on executing the one or more security functions on the unknown object) a set of threat scores and/or a set of utility values associated with the set of security functions. In this example, security device 230 may update the threat prediction model based the set of features, the set threat scores, and the set of utility values associated with the unknown object.

In some implementations, security device 230 may also store and/or update accuracy information associated with the threat prediction model. For example, security device 230 may determine accuracy information associated with whether each security function classifies the training object as a malicious object, and may store the accuracy information accordingly. In some implementations, the accuracy information may be applied to a utility value, associated with the security function, as described below.

In this way, security device 230 may receive a training object, may identify a set of features associated with the training object, may determine a set of threat scores, and may determine a set of utility values associated with the training object. Security device 230 may train (e.g., update, modify, adjust, etc.) a threat prediction model (e.g., a model designed to predict a threat score associated with an unknown object), based on the sets of features, the set of threat scores, and/or the set of utility values associated with the training object. Security device 230 may receive any number of training objects in order to improve performance and/or accuracy of the threat prediction model.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
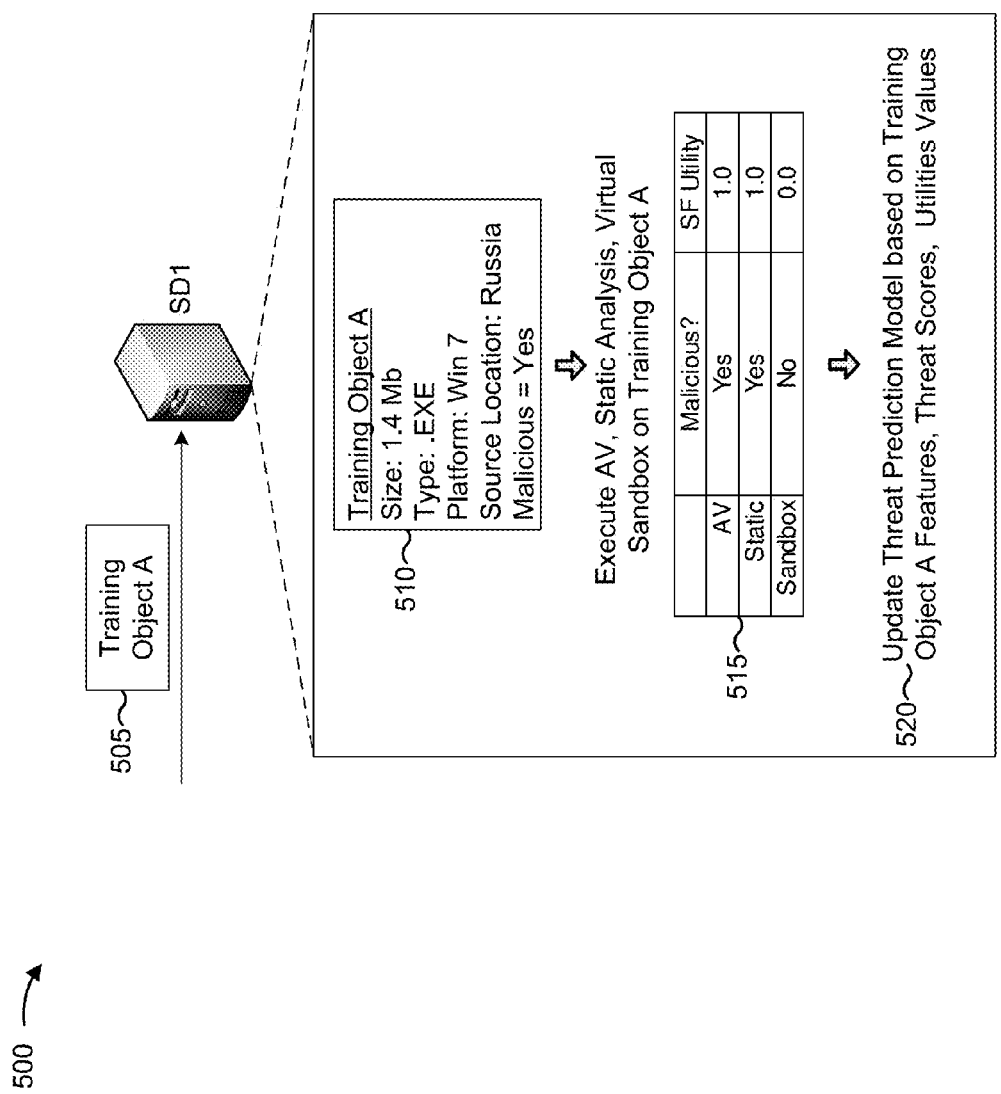
FIGS. 5A and 5B are diagrams of an example implementation relating to the example process shown in FIG. 4.
Figure 5B:
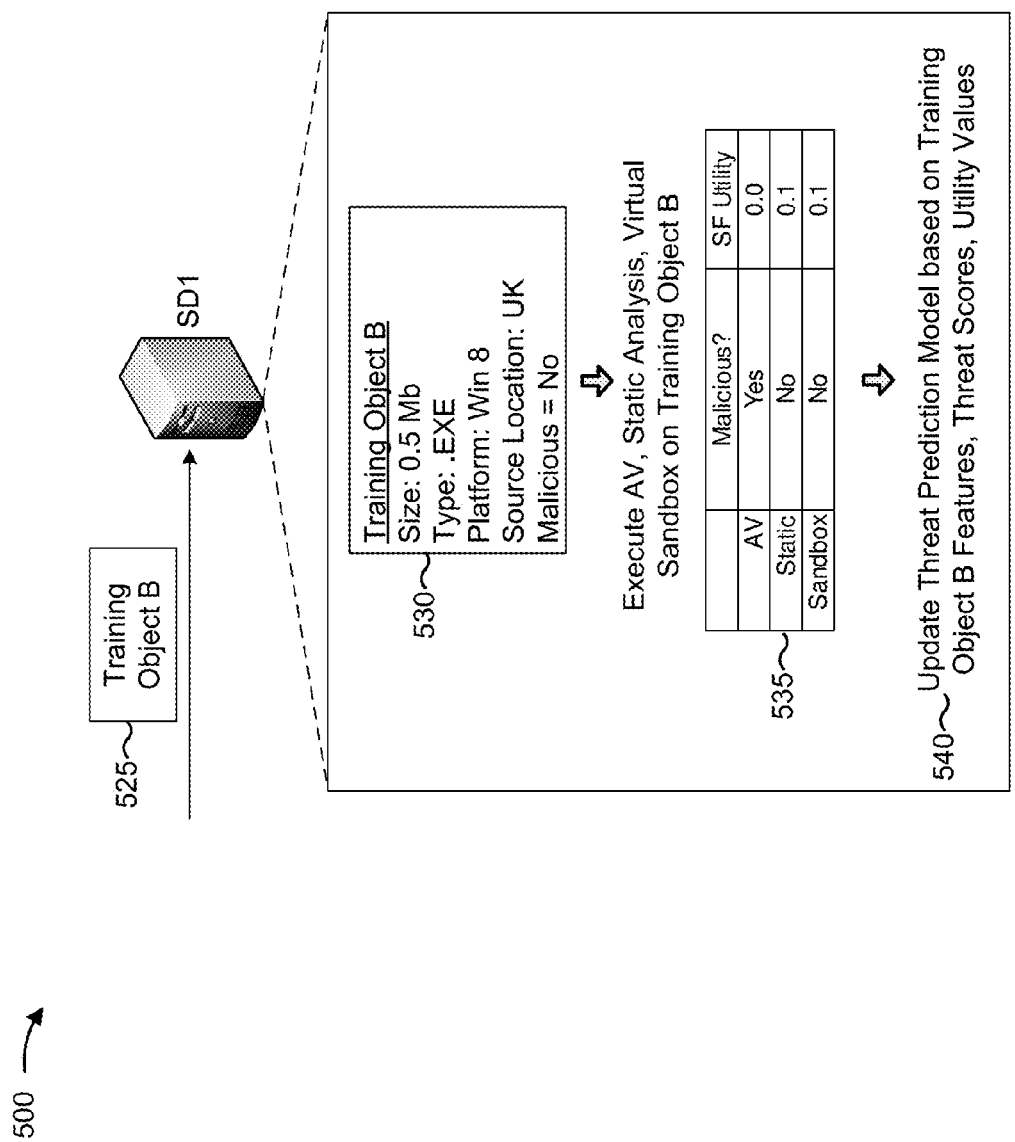

FIGS. 5A and 5B are diagrams of an example implementation 500 relating to example process 400 shown in FIG. 4. For the purposes of example implementation 500, assume that a security device (e.g., SD1) hosts a set of security functions (e.g., an anti-virus scanning function, a static analysis function, and a sandbox) associated with determining whether an unknown object (e.g., to be provided to client device 210, received by client device 210, etc.) is a malicious object. Further, assume that SD1 manages a threat prediction model associated with predicting a result of executing a security function (e.g., the anti-virus scanning function, the static analysis function, and/or the sandbox) on the unknown object.

As shown in FIG. 5A, and by reference number 505, SD1 may receive a training object (e.g., training object A) associated with updating the threat prediction model. As shown by reference number 510, SD1 may determine (e.g., based on inspecting training object A, analyzing training object A, etc.) a set of features associated with training object A (e.g., Size: 1.4 megabytes (Mb), Type: .EXE, Platform: Win 7, Source Location: Russia, Malicious=Yes). As shown by reference number 515, SD1 may execute each security function (e.g., the anti-virus scanning function, the static analysis function, and/or the sandbox function) on training object A in order to determine a set of threat scores associated with the anti-virus scanning function, the static analysis function, and the sandbox function. For the purposes of example implementation 500, assume that each security function is configured to determine a threat score that indicates whether an object is a malicious object or a benign object (e.g., Yes or No). As shown, the set of threat scores may include a threat score indicating that the anti-virus scanning function identified training object A as a malicious object (e.g., Yes), a threat score indicating that the static analysis function identified training object A as a malicious object (e.g., Yes), and a threat score indicating that the sandbox function did not identify training object A as a malicious object (e.g., No).

As shown, SD1 may determine, based on the set threat scores, a set of utility values associated with the anti-virus scanning function, the static analysis function, and the sandbox function. As shown, SD1 may determine a utility value of 1.0 for the anti-virus scanning function (e.g., since the anti-virus scanning function correctly identified training object A as a malicious object), a utility value of 1.0 for the static analysis function (e.g., since the static analysis function correctly identified training object A as a malicious object), and a utility value of 0.0 for the sandbox function (e.g., since the sandbox function incorrectly identified training object A as a benign object). As shown by reference number 520, SD1 may update the threat prediction model based on the set of features, the set of threat scores, and the utility values.

As shown in FIG. 5B, and by reference number 525, SD1 may receive another training object (e.g., training object B) associated with updating the threat prediction model. As shown by reference number 530, SD1 may determine (e.g., based on inspecting training object B, analyzing training object B, etc.) a set of features associated with training object B (e.g., Size: 0.5 Mb, Type: .EXE, Platform: Win 8, Source Location: UK, Malicious=No). As shown by reference number 535, SD1 may execute each security function (e.g., the anti-virus scanning function, the static analysis function, and/or the sandbox function) on training object B in order to determine a set of threat scores associated with the anti-virus scanning function, the static analysis function, and the sandbox function. As shown, the set of threat scores may include a threat score indicating that the anti-virus scanning function identified training object B as a malicious object (e.g., Yes), a threat score indicating that the static analysis function did not identify training object B as a malicious object (e.g., No), and a threat score indicating that the sandbox function did not identify training object B as a malicious object (e.g., No).

As shown, SD1 may determine, based on the set threat scores, a set of utility values associated with the anti-virus scanning function, the static analysis function, and the sandbox function. In this example, assume that correctly identifying a malicious object as a malicious object is more valuable than correctly identifying a benign object as a benign object. As shown, SD1 may determine a utility value of 0.0 for the anti-virus scanning function (e.g., since the anti-virus scanning function incorrectly identified training object A as a malicious object), a utility value of 0.1 for the static analysis function (e.g., since the static analysis function correctly identified training object A as a benign object), and a utility value of 0.1 for the sandbox function (e.g., since the sandbox function correctly identified training object A as a benign object). As shown by reference number 540, SD1 may again update the threat prediction model based on the set of features, the set of threat scores, and the utility values.

In this way, the SD1 may train the threat prediction model for use in determining whether unknown objects are malicious objects, as described below.

As indicated above, FIGS. 5A and 5B are provided merely as an example. Other examples are possible and may differ from what was described with regard to FIGS. 5A and 5B.

Figure 6A:
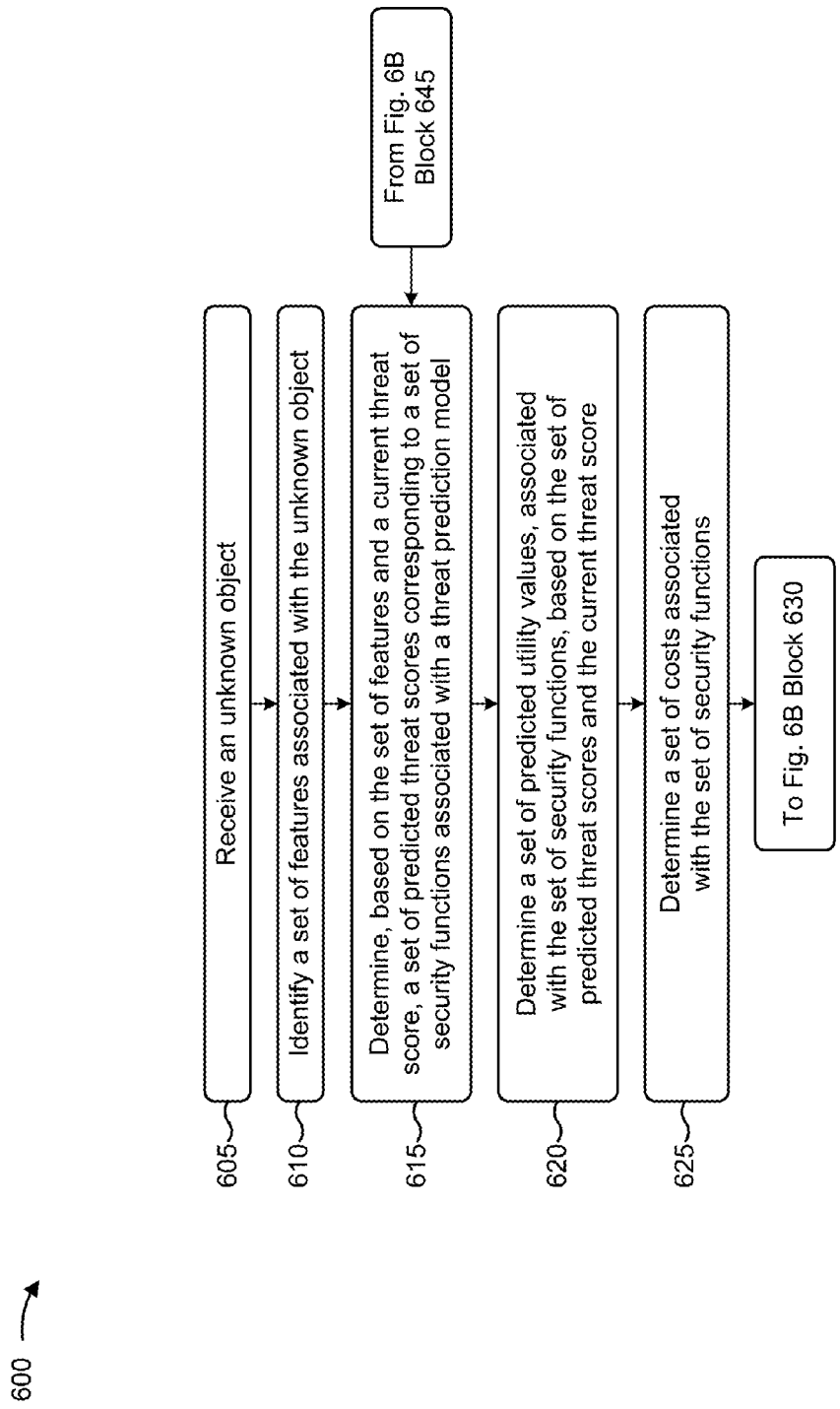

FIGS. 6A and 6B are a flow chart of an example process 600 for identifying, based a set of predicted efficiencies associated with a set of security functions included in a threat prediction model, a particular security function that is to be executed on an unknown object, and causing the particular security function to be executed on the unknown object to determine a threat score associated with the unknown object. In some implementations, one or more process blocks of FIGS. 6A and 6B may be performed by security device 230. In some implementations, one or more process blocks of FIGS. 6A and 6B may be performed by another device or a group of devices separate from or including security device 230, such as client device 210.

As shown in FIG. 6A, process 600 may include receiving an unknown object (block 605). For example, security device 230 may receive an unknown object. In some implementations, security device 230 may receive the unknown object when server device 240 provides the unknown object for transmission to client device 210 (e.g., when security device 230 is positioned to receive objects provided to client device 210). Additionally, or alternatively, security device 230 may receive the unknown object when another device provides the unknown object to security device 230, such as client device 210 or a device included in network 250.

An unknown object may include an object about which maliciousness information is unknown. In some implementations, security device 230 may receive the unknown object based on a request provided by client device 210. For example, a user of client device 210 may provide (e.g., via an input mechanism of client device 210) information that indicates that client device 210 is to receive the unknown object, and client device 210 may send a request to server device 240 (e.g., when server device 240 stores the unknown object). In this example, server device 240 may receive the request, and may provide the unknown object to security device 230 (e.g., when security device 230 is positioned to receive the unknown object before the unknown object is sent to client device 210). In some implementations, the user may be unaware that client device 210 has sent a request for the unknown object (e.g., when a program running on client device 210 is configured to automatically cause client device 210 to request an object, etc.). In some implementations, security device 230 may receive the unknown object based on the unknown object being provided by server device 240. For example, server device 240 may send the unknown object to client device 210 (e.g., without client device 210 requesting the unknown object), and security device 230 may receive the unknown object from server device 240.

Additionally, or alternatively, security device 230 may receive the unknown object from client device 210. For example, client device 210 may receive the unknown object from server device 240. In this example, client device 210 may provide the unknown object to security device 210 (e.g., in order to allow security device 230 to execute one or more security functions on the unknown object).

As further shown in FIG. 6A, process 600 may include identifying a set of features associated with the unknown object (block 610). For example, security device 230 may identify a set of features associated with the unknown object. In some implementations, security device 230 may identify the set of features, associated with the unknown object, after security device 230 receives the unknown object. Additionally, or alternatively, security device 230 may identify the set of features, associated with the unknown object, when security device 230 receives information indicating that security device 230 is to identify the set of features associated with the unknown object.

A set of features associated with an unknown object may include information associated with a size of the unknown object (e.g., an overall size of the unknown object, a size of a section of the unknown object, etc.), a signature associated with the unknown object (e.g., information associated with authenticating the unknown object), a type of the unknown object (e.g., EXE, TIFF, PDF, etc.), a source of the unknown object (e.g., a geographic location, an internet protocol (IP) address, information identifying a source network, etc.), a platform associated with the unknown object (e.g., information identifying an operating system, information identifying a version of the operating system, etc.), metadata information associated with the unknown object, and/or another type of information.

In some implementations, security device 230 may identify the set of features based on analyzing the unknown object, inspecting the unknown object, examining the unknown object, or the like. Additionally, or alternatively, security device 230 may identify the set of features based on receiving information that identifies the set of features (e.g., when security device 230 receives the information that identifies the set of features along with the unknown object).

As further shown in FIG. 6A, process 600 may include determining, based on the set of features and a current threat score, a set of predicted threat scores corresponding to a set of security functions associated with a threat prediction model (block 615). For example, security device 230 may determine, based on the set of features and a current threat score, a set of predicted threat scores corresponding to a set of security functions associated with a threat prediction model. In some implementations, security device 230 may determine the set of predicted threat scores after security device 230 identifies the set of features associated with the unknown object. Additionally, or alternatively, security device 230 may determine the set of threat scores when security device 230 receives information indicating that security device 230 is to determine the set of threat scores.

In some implementations, security device 230 may determine the set of predicted threat scores based on the set of features. For example, security device 230 may provide information associated with the set of features as input to a threat prediction model (e.g., stored or accessible by security device 230), and may receive, as output, information associated with a set of predicted threat scores corresponding to a set of security functions.

Additionally, or alternatively, security device 230 may determine the set of predicted threat scores based on a current threat score. In some implementations, a current threat score may include a default threat score. For example, security device 230 may store and/or access information identifying a default threat score, to be provided as an input to the threat prediction model, before any security function is executed on the unknown object. Additionally, or alternatively, the current threat score may include a threat score associated with executing one or more security functions on the unknown object. For example, security device 230 may provide information associated with the set of features and information associated with a current threat score (e.g., a default threat score) as input to the threat prediction model, may determine a first set of predicted efficiencies corresponding to a set of security functions (e.g., as described below), and may cause a first security function to be executed on the unknown object in order to determine a revised current threat score. In this example, assume that security device 230 determines that another security function is to be executed on the unknown object. Security device 230 may then provide information associated with the set of features and information associated with the revised current threat score as inputs to the threat prediction model, may determine a second set of predicted efficiencies corresponding to the set of security functions, and may cause a second security function to be executed on the unknown object in order to determine another revised current threat score.

As further shown in FIG. 6A, process 600 may include determining a set of predicted utility values, associated with the set of security functions, based on the set of predicted threat scores and the current threat score (block 620). For example, security device 230 may determine a set of predicted utility values, associated with the set of security functions, based on the set of predicted threat scores and the current threat score. In some implementations, security device 230 may determine the set of predicted utility values after security device 230 determines the set of predicted threat scores. Additionally, or alternatively, security device 230 may determine the set of predicted utility values when security device 230 receives information indicating that security device 230 is to determine the set of predicted utility values.

A predicted utility value may include information that identifies a predicted degree of usefulness for a predicted threat score associated with an unknown object and a security function. For example, the predicted utility value may include a predicted value (e.g., a numerical value between zero and one, a numerical value between 0 and 100, etc.) that indicates whether the security function, when executed on the object, may correctly and/or accurately determine a threat score indicating that a malicious object is a malicious object, incorrectly and/or inaccurately determine a threat score indicating that a malicious object is a benign object, correctly and/or accurately determine a threat score indicating that a benign object is a benign object, incorrectly and/or inaccurately determine a threat score indicating that a benign object is a malicious object, or the like. In some implementations, security device 230 may determine the set of predicted utility values based on the threat prediction model. For example, security device 230 may provide, as input to the threat prediction model, information associated with the set of features associated with the unknown object, and may receive, as an output, the set of predicted utility values corresponding to the set of security functions.

As further shown in FIG. 6A, process 600 may include determining a set of costs associated with the set of security functions (block 625). For example, security device 230 may determine a set of costs associated with the set of security functions. In some implementations, security device 230 may determine the set of costs when security device 230 computes the set of predicted utility values associated with the set of security functions. Additionally, or alternatively, security device 230 may determine the set of costs when security device 230 receives information indicating that security device 230 is to determine the set of costs.

A cost associated with a security function may include information identifying an amount of resources associated with executing the security function on an unknown object. For example, the cost may identify a quantity of computing resources (e.g., a quantity of CPU time, a quantity of memory, etc.), a length of time (e.g., a length of time associated with a queue corresponding to the security function, a length of time needed by the security function to execute the security function on the unknown object, etc.).

In some implementations, security device 230 may determine the set of costs based on information stored and or accessible by security device 230 (e.g., when a cost, associated with a security function, is a known and/or consistent cost). Additionally, or alternatively, security device 230 may determine the set of costs based on information associated with the set of security functions. For example, security device 230 may determine information associated with a queue length associated with a security function, and may determine a cost, associated with the security function, based on the information associated with the queue length. Additionally, or alternatively security device 230 may determine the set of costs based on information associated with the threat prediction model (e.g., when security device 230 updates the threat prediction model to include information associated security function costs during training).

As further shown in FIG. 6B, process 600 may include determining a set of predicted efficiencies, associated with the set of security functions, based on the set of predicted utility values and the set of costs (block 630). For example, security device 230 may determine a set of predicted efficiencies, associated with the set of security functions, based on the set of predicted utility values and the set of costs. In some implementations, security device 230 may determine the set of predicted efficiencies after security device 230 determines the set of predicted utility values. Additionally, or alternatively, security device 230 may determine the set of predicted efficiencies after security device 230 determines the set of costs. Additionally, or alternatively, security device 230 may determine the set of predicted efficiencies when security device 230 receives information indicating that security device 230 is to determine the set of predicted efficiencies.

A predicted efficiency may include information that identifies a predicted utility value, associated with executing a security function on an unknown object, relative to a cost associated with executing the security function on the unknown object. In other words, the predicted efficiency may indicate an added value of executing the security function on the unknown object with consideration of the cost of executing the security function (e.g., such that resources may be used efficiently in order to maximize a utility value-to-cost ratio).

In some implementations, security device 230 may determine the set of predicted efficiencies based on the set of predicted utility values and the set of costs. For example, assume that security device 230 has determined a set of predicted utility values and a set of costs, as described above. In this example, security device 230 may determine the set of predicted efficiencies by dividing each predicted utility value by a corresponding cost. In some implementations, security device 230 may apply a different technique in order to determine the set of predicted efficiencies based on the set of predicted utility values and the set of costs.

As further shown in FIG. 6B, process 600 may include identifying, based on the set of predicted efficiencies, a particular security function to be executed on the unknown object (block 635). For example, security device 230 identify, based on the set of predicted efficiencies, a particular security function to be executed on the unknown object. In some implementations, security device 230 may identify the particular security function after security device 230 determines the set of predicted efficiencies.

In some implementations, security device 230 may identify the particular security function based on the set of predicted efficiencies. For example, security device 230 may identify the particular security function as a security function corresponding to the greatest predicted efficiency of the set of predicted efficiencies. Additionally, or alternatively, security device 230 may identify the particular security function based on an efficiency threshold. For example, security device 230 may store and/or access information that identifies an efficiency threshold, and may identify a group of predicted efficiencies that satisfy the efficiency threshold. Here, security device 230 may identify the particular security function as one of the group of security functions (e.g., a security function, of the group of security functions, with a lowest cost, etc.). In some implementations, security device 230 may identify multiple particular security functions (e.g., security functions, of the group of security functions, with lowest costs, etc.). Additionally, or alternatively, security device 230 may identify the particular security function in another manner.

As further shown in FIG. 6B, process 600 may include causing the particular security function to be executed on the unknown object in order to determine a revised current threat score associated with the unknown object (block 640). For example, security device 230 may cause the particular security function to be executed on the unknown object. In some implementations, security device 230 may cause the particular security function to be executed on the unknown object after security device 230 identifies the particular security function. Additionally, or alternatively, security device 230 may cause the particular security function to be executed on the unknown object when security device 230 receives information indicating that security device 230 is to cause the particular security function to be executed on the unknown object.

In some implementations, security device 230 may cause the particular security function to be executed on the unknown object by executing the particular security function on the unknown object (e.g., when security device 230 hosts the particular security function). Additionally, or alternatively, security device 230 may cause the particular security function to be executed on the unknown object by providing the unknown object to another device (e.g., when the other device hosts the security function).

In some implementations, security device 230 may cause multiple particular security functions to be executed on the unknown object in parallel or in series.

Additionally, or alternatively, security device 230 may place the unknown object in a priority queue associated with the particular security function (e.g., a queue associated with executing the security function on unknown objects with higher efficiencies before executing the security function on unknown objects with lower efficiencies), and the security function may be executed on the unknown object when the unknown object reaches the front of the priority queue. Alternatively, the unknown object may remain in the priority queue for a threshold amount of time (e.g., after which the unknown object is returned to security device 230 and/or provided to client device 210).

In some implementations, security device 230 may determine a revised current threat score as a result of causing the particular security function to be executed on the unknown object. For example, assume that a current threat score, associated with an unknown object, is a default threat score (e.g., when no security functions have been executed on the unknown object). Here, security device 230 may receive, as a result of causing the particular security function to be executed on the unknown object, a threat score associated with executing the particular security function on the unknown object. In this example, security device 230 may determine the revised current threat score as the threat score associated with executing the particular security function on the unknown object (e.g., rather than the default threat score).

In some implementations, security device 230 may determine the revised current threat score based on a previous revised current threat score. For example, security device 230 may determine a first revised current threat score, associated with executing a first security function on the unknown object. Here, security device 230 may cause a second security function to be executed on the unknown object, and may determine a second revised current threat score based on the first revised current threat score and a threat score determined based on the second security function (e.g., an average of the first revised current threat score and the threat score determined based on the second security function, a highest threat score of the first revised current threat score and the threat score determined based on the second security function, etc.).

As further shown in FIG. 6B, process 600 may include determining whether to execute another security function on the unknown object (block 645). For example, security device 230 may determine whether to execute another security function on the unknown object. In some implementations, security device 230 may determine whether to execute another security function on the unknown object after security device 230 causes the particular security function to be executed on the unknown object. Additionally, or alternatively, security device 230 may determine whether another security function is to be executed on the object after security device 230 determines the revised current threat score associated with the unknown object.

In some implementations, security device 230 may determine whether another security function is to be executed on the unknown object based on a threshold. For example, security device 230 may store and/or access a threat score threshold, and security device 230 may determine whether to execute another security function on the unknown object based on the threat score threshold (e.g., if the revised current threat score does not satisfy the threat score threshold, then security device 230 may determine that another security function is to be executed on the unknown object, if the revised current threat score satisfies the threat score threshold, then security device 230 may determine that another security function is not to be executed on the unknown object). As another example, security device 230 may determine whether to execute another security function on the unknown object based on a security function threshold (e.g., a threshold indicating that a threshold quantity of security functions are to be executed on the unknown object). As yet another example, security device 230 may determine whether to execute another security function on the unknown object based on a utility value threshold (e.g., a threshold indicating that a utility value, associated with the particular security function and determined based on the threat prediction model, is satisfied). In some implementations, security device 230 may determine whether another security function is to be executed in another manner.

Additionally, or alternatively, security device 230 may determine whether another security function is to be executed on the unknown object based on the set of security functions. For example, if all security functions included in the set of security functions have been executed on the unknown object, then security device 230 may determine that another security function is not to be executed on the unknown object.

As further shown in FIG. 6B, if another security function is to be executed on the unknown object (block 645—YES), then process 600 may include returning to block 615 of FIG. 6A. For example, security device 230 may determine that another security function is to be executed on the unknown object, and security device 230 may determine, based on the set of features the and revised current threat score, another set of predicted threat scores corresponding to another set of security functions associated with a threat prediction model (e.g., a set of security functions not including the particular security function already executed on the unknown object).

In some implementations, security device 230 may repeat process 600 until security device 230 determines that another security function is not to be executed on the unknown object, as described above.

As further shown in FIG. 6B, if another security function is not to be executed on the unknown object (block 645—YES), then process 600 may include classifying the object based on the revised current threat score (block 650). For example, security device 230 may determine that another security function is not to be executed on the unknown object, and security device 230 may classify the object based on the revised current threat score.

In some implementations, security device 230 may classify the unknown object as a malicious object based on the revised current threat score. For example, security device 230 may classify the unknown object as a malicious object based on comparing the revised current threat score to a threat score threshold stored and/or accessible by security device 230. Alternatively, security device 230 may classify the unknown object as a benign object (e.g., a non-malicious object) based on the revised current threat score (e.g., when the revised current threat score satisfies the threat score threshold). For example, security device 230 may classify the unknown object as a non-malicious object based on comparing the revised current threat score to the threat score threshold stored and/or accessible by security device 230 (e.g., security device 230 may classify the unknown object as a non-malicious object when the revised current threat score does not satisfy the threat score threshold). Additionally, or alternatively, security device 230 may classify the object in another manner and/or by providing the revised current threat score to another device.

In some implementations, security device 230 may provide (e.g., to client device 210, to server device 240, etc.) information associated with classifying the unknown object (e.g., an indication whether the unknown object is classified as a malicious object or a non-malicious object). Additionally, or alternatively, security device 230 may provide the object to client device 210 (e.g., when the unknown object is classified as a non-malicious object).

In some implementations, security device 230 may update the threat prediction model based on the set of features, the revised current threat score, and/or other information associated with the unknown object, as described above.

Although FIGS. 6A and 6B show example blocks of process 600, in some implementations, process 600 may include additional blocks, fewer blocks, different blocks, or differently arranged blocks than those depicted in FIGS. 6A and 6B. Additionally, or alternatively, two or more of the blocks of process 600 may be performed in parallel.

Figure 7A:
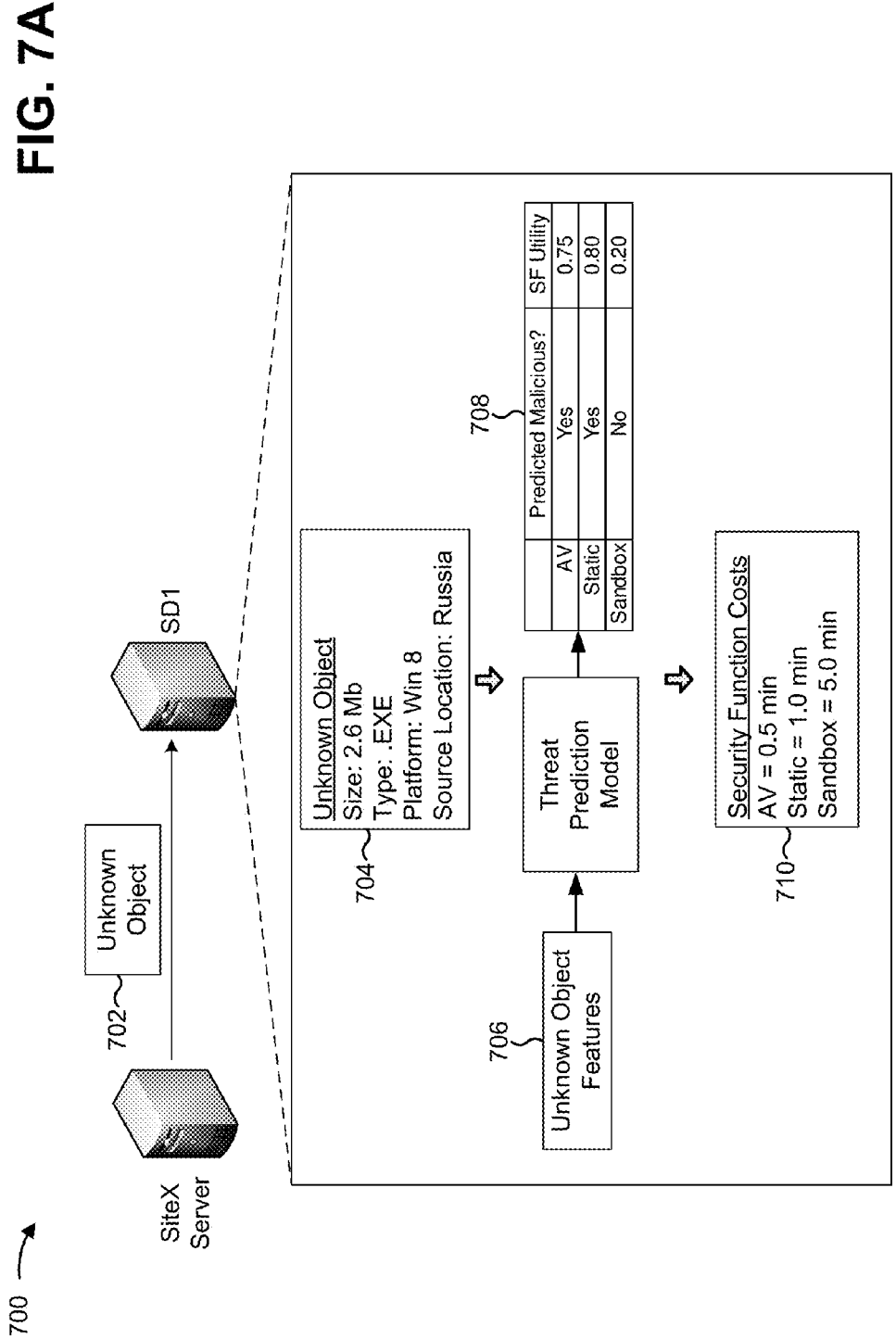
FIGS. 7A-7C are diagrams of an example implementation relating to the example process shown in FIGS. 6A and 6B.
Figure 7B:
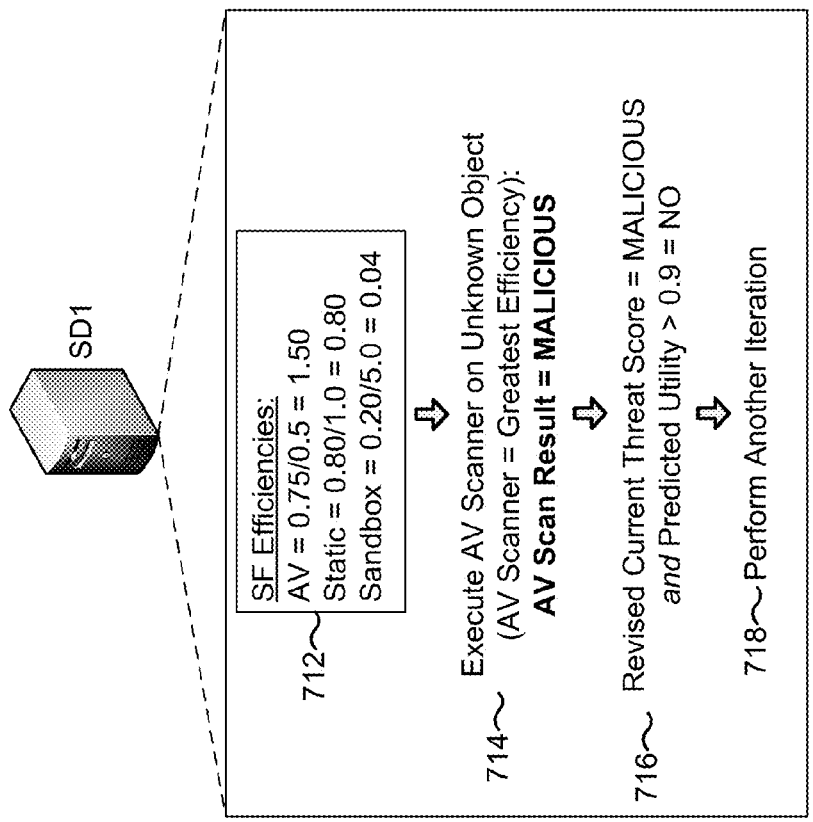
Figure 7C:
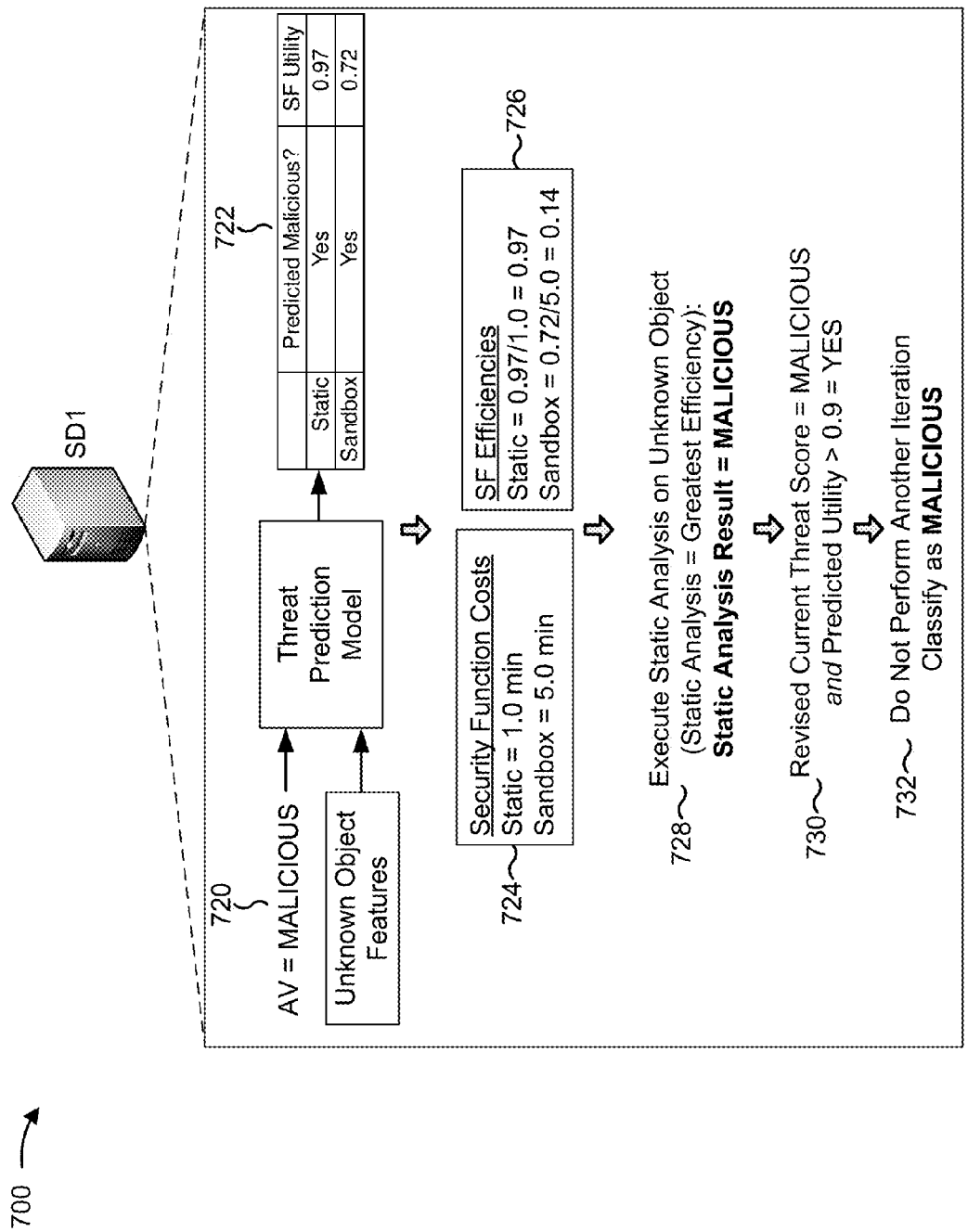

FIGS. 7A-7C are diagrams of an example implementation 700 relating to example process 600 shown in FIGS. 6A and 6B. For the purposes of example implementation 700, assume that a security device (e.g., SD1) hosts a set of security functions (e.g., an anti-virus scanning function, a static analysis function, and a sandbox) associated with determining whether an unknown object (e.g., to be provided to client device 210, received by client device 210, etc.) is a malicious object. Further, assume that SD1 manages a threat prediction model associated with predicting a result of executing one or more of the security functions (e.g., the anti-virus scanning function, the static analysis function, and/or the sandbox) on the unknown object.

As shown in FIG. 7A, and by reference number 702, server device 240 (e.g., SiteX server) may provide (e.g., based on a request from client device 210 protected by SD1) an unknown object to SD1. As shown by reference number 704, SD1 may determine (e.g., based on inspecting the unknown object, analyzing the unknown object, etc.) a set of features associated with the unknown object (e.g., Size: 2.6 Mb, Type: .exe, Platform: Win 8, Source Location: Russia). As shown by reference number 706, SD1 may provide, as inputs to the threat prediction model, information associated with the set of features (e.g., and information associated with a default threat score), and may receive, as an output from the threat prediction model, a first set of predicted threat scores associated with the unknown object. For the purposes of example implementation 700, assume that each security function is configured to determine a threat score that indicates whether an object is a malicious object or a benign object (e.g., Yes or No). As shown, the set of predicted threat scores may include a predicted threat score for the anti-virus scanning function (e.g., Yes), a predicted threat score for the static analysis function (e.g., Yes), and a predicted threat score for the sandbox function (e.g., No).

As shown, SD1 may also determine, based on an output of the threat prediction model, a first set of predicted utility values associated with the anti-virus scanning function, the static analysis function, and the sandbox function. As shown, the first set of predicted utility values may include a predicted utility value of executing the anti-virus scanning function on the unknown object of 0.75 a predicted utility value of executing the static analysis function on the unknown object of 0.80, and a predicted utility value of executing the sandbox function on the unknown object of 0.20. As shown by reference number 710, SD1 may determine (e.g., based on information stored and/or accessible by SD1) a set of costs associated with the anti-virus scanning function, the static analysis function, and the sandbox function. As shown, the set of costs may include information indicating that executing the anti-virus scanning function on the unknown object has a cost of 0.5 minutes, executing the static analysis function on the unknown object has a cost of 1.0 minutes, and executing the sandbox function on the unknown object has a cost of 5.0 minutes.

As shown in FIG. 7B, and by reference number 712, SD1 may determine, based on the first set of predicted utility values and the set of costs, a first set of predicted efficiencies associated with the anti-virus scanning function, the static analysis function, and the sandbox function. As shown, the first set of predicted efficiencies may include information indicating that a predicted efficiency of executing the anti-virus scanning function on the unknown object is 1.50 (e.g., 0.75/0.5=1.50), a predicted efficiency of executing the static analysis function on the unknown object is 0.80 (e.g., 0.80/1.0=0.80), and a predicted efficiency of executing the sandbox function on the unknown object is 0.04 (e.g., 0.20/5.0=17).

As shown by reference number 714, SD1 may identify, based on the first set of predicted efficiencies, the anti-virus scanning function as the security function with the greatest predicted efficiency (e.g., 1.50>0.80, 1.50>0.04), and may execute the anti-virus scanning function on the unknown object. As shown, assume that executing the anti-virus scanning function on the unknown object results in the anti-virus scanning function identifying the unknown object as a malicious object. As shown, SD1 may revise the current threat score accordingly. As shown by reference number 716, SD1 may determine (e.g., based on information stored or accessible by SD1) threshold information associated with determining whether another security function is to be executed on the unknown object. As shown, the threshold information may indicate that another security function is not to be executed on the unknown object when the revised current threat identifies the object as malicious and when the predicted utility value of the most recent predicted threat score is greater than 0.90. As shown by reference number 718, SD1 may determine that another security function is to be executed on the unknown object (e.g., since the threshold is not satisfied).

As shown in FIG. 7C, and by reference number 720, SD1 may provide information associated with the revised current threat score as determined by the anti-virus scanning function (e.g., AV=Malicious) and the set of features, associated with the unknown object, as input to the threat prediction model, and as shown by reference number 722, may receive, as an output of the threat prediction model, a second set of predicted threat scores associated with the unknown object. As shown, the second set of predicted threat scores may include a predicted threat score associated with the static analysis function (e.g., Yes), and a predicted threat score associated with the sandbox function (e.g., Yes).

As shown, SD1 may also determine, based on an output of the threat prediction model, a second set of predicted utility values associated with the static analysis function and the sandbox function. As shown, the second set of predicted utility values may include a predicted utility value of executing the static analysis function on the unknown object of 0.97, and a predicted utility value of executing the sandbox function on the unknown object of 0.72. As shown by reference number 724, SD1 may determine the set of costs associated with the static analysis function, and the sandbox function. As shown, the set of costs may include information indicating that executing the static analysis function on the unknown object has a cost of 1.0 minutes, and executing the sandbox function on the unknown object has a cost of 5.0 minutes.

As shown by reference number 726, SD1 may determine, based on the second set of predicted utility values and the set of costs, a second set of predicted efficiencies associated with the static analysis function and the sandbox function. As shown, the second set of predicted efficiencies may include information indicating that a predicted efficiency of executing the static analysis function on the unknown object is 0.97 (e.g., 0.97/1.0=0.97), and a predicted efficiency of executing the sandbox function on the unknown object is 0.14 (e.g., 0.72/5.0=0.14).

As shown by reference number 728, SD1 may identify, based on the second set of predicted efficiencies, the static analysis function as the security function with the greatest predicted efficiency (e.g., 0.97>0.14), and may execute the static analysis function on the unknown object. As shown, assume that the static analysis function is executed on the unknown object, that the static analysis function also identifies the object as a malicious object, and that SD1 determines another revised current threat score, accordingly. As shown by reference number 730, SD1 may determine the threshold information associated with determining whether another security function is to be executed on the unknown object. As shown by reference number 732, since the revised current threat score indicates that the object is a malicious object, and since the most recent predicted utility value (e.g., associated with the static analysis function) is 0.97 (e.g., since 0.97>0.90), SD1 may determine that another security function is not to be executed on the unknown object.

SD1 may then classify the unknown object as malicious (e.g., based on the revised current threat score) and/or may provide (e.g., to the SiteX server, to client device 210) information indicating that the unknown object is a malicious object. Additionally, SD1 may further update the threat prediction model based on the set of features, the revised current threat score, and/or other information determined by SD1 as described above.

As indicated above, FIGS. 7A-7C are provided merely as an example. Other examples are possible and may differ from what was described with regard to FIGS. 7A-7C.

Implementations described herein may provide a security device with a threat prediction model that may be used to identify a subset of security functions, of a set of security functions, that, when executed on an unknown object, may provide a determination of whether the unknown object is a malicious object while efficiently using computing resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors, at least partially implemented in hardware, to:
   receive an unknown object;
   identify a set of features associated with the unknown object;
   determine, based on inputting the set of features into a threat prediction model, a set of predicted threat scores,
      the threat prediction model being associated with a set of security functions, and
      a predicted threat score, of the set of predicted threat scores,
   corresponding to a security function of the set of security functions;
   determine, based on the set of predicted threat scores, a set of predicted utility values,
      a predicted utility value, of the set of predicted utility values,
   corresponding to a security function of the set of security functions;
   determine a set of costs corresponding to the set of security functions;
   determine a set of predicted efficiencies, associated with the set of security functions, based on the set of predicted utility values and the set of costs;
   identify, based on the set of predicted efficiencies, a particular security function, of the set of security functions, that is to be executed on the unknown object;
   cause the particular security function to be executed on the unknown object in order to determine a current threat score associated with the unknown object; and
   determine, based on the current threat score, whether another security function, of the set of security functions, is to be executed on the unknown object.

2. The device of claim 1, where the one or more processors, when determining whether another security function is to be executed on the unknown object, are to:
   determine that another security function is not to be executed on the unknown object;
   classify the unknown object as a malicious object or a non-malicious object based on the current threat score; and
   provide information associated with classifying the object as a malicious object or a non-malicious object.

3. The device of claim 1, where the one or more processors, when determining whether another security function is to be executed on the unknown object, are to:
   determine that another security function is to be executed on the unknown object;
   determine, based on inputting the set of features and the current threat score into the threat prediction model, another set of predicted threat scores,
      the other set of predicted threat scores corresponding to another set of security functions,
         the other set of security functions including a group of security functions that does not include the particular security function;
   determine, based on the other set of predicted threat scores, another set of predicted utility values,
      the other set of predicted utility values corresponding to the other set of security functions;
   determine another set of predicted efficiencies, associated with the other set of security functions, based on the other set of predicted utility values and the set of costs;
   identify, based on the other set of predicted efficiencies, another particular security function, of the other set of security functions, that is to be executed on the unknown object; and
   cause the other particular security function to be executed on the unknown object in order to determine another current threat score associated with the unknown object.

4. The device of claim 1, where the one or more processors are further to:
   update the threat prediction model based on the set of features and the current threat score.

5. The device of claim 1, where the one or more processors are further to:
   receive a training object;
   identify a set of features associated with the training object;
   cause the set of security functions to be executed on the training object in order to determine a set of threat scores associated with the training object;
   determine a set of utility values, corresponding to the set of threat scores, based on the set of threat scores; and
   update the threat prediction model based on the set of features associated with the training object, the set of threat scores, and the set of utility values.

6. The device of claim 1, where the one or more processors, when determining the set of predicted efficiencies, are to:
   input a predicted utility value, included in set of predicted utility values, and a corresponding cost, included in the set of costs, into a predicted efficiency function; and
   determine a predicted efficiency, of the set of predicted efficiencies, as a value equal to an output of the predicted efficiency function.

7. The device of claim 1, where the one or more processors, when identifying the particular security function that is to be executed on the unknown object, are to:
   identify a greatest predicted efficiency of the set of predicted efficiencies; and
   identify the particular security function as a security function that corresponds to the greatest predicted efficiency.

8. A computer-readable medium storing instructions, the instructions comprising:
   one or more instructions that, when executed by one or more processors, cause the one or more processors to:
      obtain an unknown object;
      identify a set of features associated with the unknown object;
      determine, based on providing the set of features as an input to a threat prediction model, a set of predicted threat scores and a set of predicted utility values,
         the threat prediction model being associated with a set of security functions, and
         a predicted threat score, of the set of predicted threat scores,
            corresponding to a security function of the set of security functions;
      identify, based on the set of predicted threat scores, a set of predicted utility values,
         a predicted utility value, of the set of predicted utility values,
            corresponding to a security function of the set of security functions;
      determine a set of costs corresponding to the set of security functions;
      determine a set of predicted efficiencies based on the set of predicted utility values and the set of costs,
         a predicted efficiency, of the set of predicted efficiencies, corresponding to a security function of the set of security functions;
      identify, based on the set of predicted efficiencies, a particular security function, of the set of security functions, that is to be executed on the unknown object;
      cause the particular security function to be executed on the unknown object;
      determine a current threat score, associated with the unknown object, based on causing the particular security function to be executed on the unknown object; and
      determine, based on the current threat score, whether the unknown object is a malicious object.

9. The computer-readable medium of claim 8, where the one or more instructions, when executed by the one or more processors, further cause the one or more processors to:
   determine that another security function, of the set of security functions, is not to be executed on the unknown object;
   classify the unknown object as a malicious object or a non-malicious object based on the current threat score; and
   provide information associated with classifying the object as a malicious object or a non-malicious object.

10. The computer-readable medium of claim 8, where the one or more instructions, when executed by the one or more processors, further cause the one or more processors to:
    determine that another security function, of the set of security functions, is to be executed on the unknown object;
    determine, based on providing the set of features and the current threat score as inputs to the threat prediction model, another set of predicted threat scores,
       the other set of predicted threat scores corresponding to another set of security functions,
          the other set of security functions including a group of security functions that does not include the particular security function;
    identify, based on the other set of current threat scores, another set of predicted utility values,
       the other set predicted utility values corresponding to the other set of security functions;
    determine another set of predicted efficiencies, associated with the other set of security functions, based on the other set of predicted utility values and the set of costs;
    identify, based on the other set of predicted efficiencies, another particular security function, of the other set of security functions, that is to be executed on the unknown object;
    cause the other particular security function to be executed on the unknown object; and
    determine another current threat score, associated with the unknown object, based on causing the particular security function to be executed on the unknown object.

11. The computer-readable medium of claim 8, where the one or more instructions, when executed by the one or more processors, further cause the one or more processors to:
    receive a training object;
    identify a set of features associated with the training object;
    cause each security function, of the set of security functions, to be executed on the training object in order to determine a set of threat scores associated with the training object;
    determine a set of utility values, corresponding to the set of threat scores, based on the set of threat scores; and
    update the threat prediction model based on the set of features, associated with the training object, the set of threat scores, and the set of utility values.

12. The computer-readable medium of claim 8, where the one or more instructions, when executed by the one or more processors, further cause the one or more processors to:
    determine a threat score threshold;
    compare the current threat score to the threat score threshold; and determine whether another security function is to be executed on the unknown object based on comparing the current threat score to the threat score threshold.

13. The computer-readable medium of claim 8, where the one or more instructions, that cause the one or more processors to determine the set of predicted efficiencies, cause the one or more processors to:
provide a predicted utility value, included in set of predicted utility values, and a corresponding cost, included in the set of costs, as inputs in to a predicted efficiency function; and
determine a predicted efficiency, of the set of predicted efficiencies, as a value equal to an output of the predicted efficiency function.

14. The computer-readable medium of claim 8, where the one or more instructions, that cause the one or more processors to identify the particular security function that is to be executed on the unknown object, cause the one or more processors to:
determine a threshold;
identify a predicted efficiency, of the set of predicted efficiencies, that satisfies the threshold; and
identify the particular security function as a security function that corresponds to the identified predicted efficiency.

15. A method, comprising:
receiving, by a device, an unknown object;
identifying, by the device, features associated with the unknown object;
providing, by the device, information associated with the features as input to a model associated with a set of security functions;
receiving, by the device and as an output of the model, a set of predicted utility values,
a predicted utility value, of the set of predicted utility values, corresponding to a security function of the set of security functions;
determining, by the device, a set of costs corresponding to the set of security functions;
determining, by the device and based on the set of predicted utility values and the set of costs, a set of predicted efficiencies associated with the set of security functions;
identifying, by the device and based on the set of predicted efficiencies, a particular security function, of the set of security functions, that is to be executed on the unknown object;
executing, by the device, the particular security function on the unknown object in order to determine a revised threat score associated with the unknown object; and
determining, by the device and based on the revised threat score, whether another security function, of the set of security functions, is to be executed on the unknown object.

16. The method of claim 15, where determining whether another security function is to be executed on the unknown object comprises:
determining that another security function is not to be executed on the unknown object;
classifying the unknown object as a malicious object or a non-malicious object based on the revised threat score; and
providing information associated with classifying the object as a malicious object or a non-malicious object.

17. The method of claim 15, where determining whether another security function is to be executed on the unknown object comprises:
determining that another security function is to be executed on the unknown object;
providing the information associated with the features and the revised threat score as inputs to the model;
receiving another set of predicted utility values;
the other set of predicted utility values corresponding to another set of security functions,
the other set of security functions including a group security functions that does not include the particular security function;
determining another set of predicted efficiencies, associated with the other set of security functions, based on the other set of predicted utility values and the set of costs;
identifying, based on the other set of predicted efficiencies, another particular security function, of the other set of security functions, that is to be executed on the unknown object; and
executing the other particular security function on the unknown object in order to determine another revised threat score associated with the unknown object.

18. The method of claim 15, further comprising:
receiving a training object;
identifying features associated with the training object;
causing the set of security functions to be executed on the training object in order to determine a set of threat scores associated with the training object;
determining a set of utility values, corresponding to the set of threat scores, based on the set of threat scores; and
updating the model based on the features, the set of threat scores, and the set of utility values.

19. The method of claim 15, where determining whether another security function is to be executed on the unknown object comprises:
determining that each security function, of the set of security functions, has been executed on the unknown object; and
determining that another security function is not to be executed on the unknown object based on determining that each security function, of the set of security functions, has been executed on the unknown object.

20. The method of claim 15, where identifying the particular security function that is to be executed on the unknown object comprises:
identifying a greatest predicted efficiency of the set of predicted efficiencies; and
identifying the particular security function as a security function that corresponds to the greatest predicted efficiency.

* * * * *